United States Patent
Dohi

(10) Patent No.: US 12,049,931 B2
(45) Date of Patent: Jul. 30, 2024

(54) REVERSE-INPUT BLOCKING CLUTCH

(71) Applicant: NSK LTD., Tokyo (JP)

(72) Inventor: Nagao Dohi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/272,646

(22) PCT Filed: Dec. 17, 2021

(86) PCT No.: PCT/JP2021/046770
§ 371 (c)(1),
(2) Date: Jul. 17, 2023

(87) PCT Pub. No.: WO2022/168466
PCT Pub. Date: Aug. 11, 2022

(65) Prior Publication Data
US 2024/0077118 A1 Mar. 7, 2024

(30) Foreign Application Priority Data
Feb. 8, 2021 (JP) ................. 2021-018307

(51) Int. Cl.
*F16D 41/10* (2006.01)
*F16D 43/21* (2006.01)
*F16D 67/02* (2006.01)

(52) U.S. Cl.
CPC ............. *F16D 41/10* (2013.01); *F16D 43/21* (2013.01); *F16D 67/02* (2013.01)

(58) Field of Classification Search
CPC .......... F16D 41/10; F16D 41/08; F16D 43/21; F16D 43/211
See application file for complete search history.

(56) References Cited

U.S. PATENT DOCUMENTS 3,051,282 A * 8/1962 Greene ..................... F16D 3/50
74/530
4,591,029 A 5/1986 Da Foe
(Continued)

FOREIGN PATENT DOCUMENTS

EP 3 663 601 A1 6/2020
EP 3 792 516 A1 3/2021
(Continued)

OTHER PUBLICATIONS

International Search Report of PCT/JP2021/046770 dated Mar. 8, 2022 [PCT/ISA/210].

*Primary Examiner* — Huan Le
(74) *Attorney, Agent, or Firm* — Sughrue Mion, PLLC

(57) ABSTRACT

A reverse-input blocking clutch, including a pressed member having a pressed surface, an input member having an input-side engaging portion coaxially arranged on an inner side in a radial direction of the pressed surface, an output member having an output-side engaging portion coaxially arranged further on the inner side in the radial direction than the input-side engaging portion, an engaging element having a pressing surface facing the pressed surface; an input-side engaged portion engageable with the input-side engaging portion; and an output-side engaged portion engageable with the output-side engaging portion; the engaging element movable in a first direction as a direction away from or toward the pressed surface, and an elastic member elastically held between the output-side engaging portion and the engaging element in the first direction.

13 Claims, 22 Drawing Sheets

(56) References Cited

U.S. PATENT DOCUMENTS

| | | | |
|---|---|---|---|
| 6,871,735 B2* | 3/2005 | Kawai | F16D 41/105 |
| | | | 192/38 |
| 10,704,610 B2* | 7/2020 | Chino | F16D 13/16 |
| 2018/0347643 A1* | 12/2018 | Itomi | F16D 15/00 |

FOREIGN PATENT DOCUMENTS

| | | |
|---|---|---|
| WO | 2019/026794 A1 | 2/2019 |
| WO | 2019/216280 A1 | 11/2019 |
| WO | 2021/107073 A1 | 6/2021 |

* cited by examiner

FIG. 15 (A)(a)            FIG. 15 (B)(a)
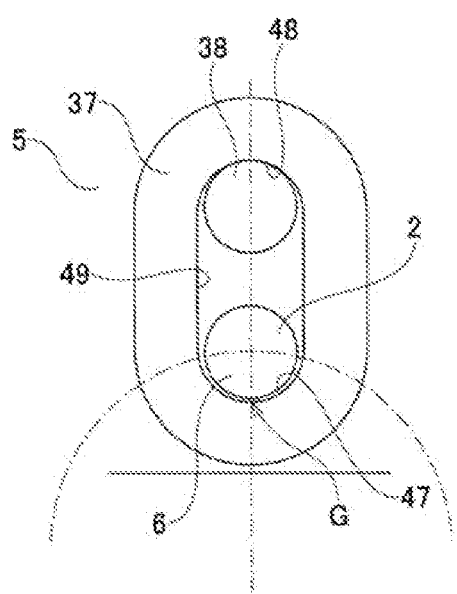 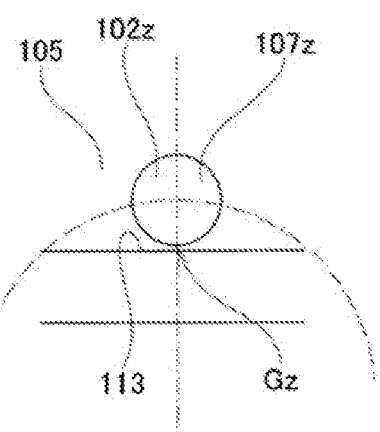
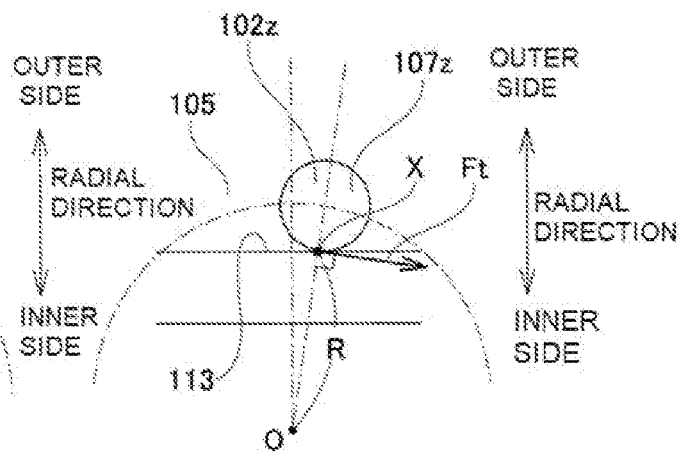
FIG. 15 (A)(b)            FIG. 15 (B)(b)

REVERSE-INPUT BLOCKING CLUTCH

CROSS REFERENCE TO RELATED APPLICATIONS

This application is a National Stage of International Application No. PCT/JP2021/046770 filed on Dec. 17, 2021, claiming priority based on Japanese Patent Application No. 2021-018307 filed on Feb. 8, 2021.

TECHNICAL FIELD

The present invention relates to a reverse-input blocking clutch that transmits rotational torque input to an input member to an output member, while completely blocking rotational torque that is reversely input to the output member so as not to transmit it to the input member, or transmitting only a part of it to the input member and blocking the remaining part.

BACKGROUND ART

FIGS. 20 to 22 illustrate an example of conventional construction of a reverse-input blocking clutch described in WO 2019/026794.

A reverse-input blocking clutch 101 includes an input member 102, an output member 103, a pressed member 104, and a pair of engaging elements 105.

The input member 102 is connected to an input-side mechanism such as an electric motor or the like, and rotational torque is input to the input member 102. The input member 102 has an input shaft portion 106, and a pair of input-side engaging portions 107. The base-end portion of the input shaft portion 106 is connected to an output portion of the input-side mechanism. The pair of input-side engaging portions 107 is configured by convex portions that extend in the axial direction from two locations on the tip-end surface of the input shaft portion 106 on opposite sides in the radial direction.

The output member 103 is connected to an output-side mechanism such as a speed-reducing mechanism or the like, and outputs rotational torque. The output member 103 is coaxially arranged with the input member 102, and has an output-shaft portion 108 and an output-side engaging portion 109. The base-end portion of the output-shaft portion 108 is connected to an input portion of the output-side mechanism. The output-side engaging portion 109 has a substantially elliptical columnar shape that extends in the axial direction from the central portion of the tip-end surface of the output-shaft portion 108. The output-side engaging portion 109 is arranged in a portion between the pair of input-side engaging portions 107.

The pressed member 104 has an annular shape, and by being fastened to another member such as a housing or the like, the rotation of the pressed member 104 is restricted. The pressed member 104 is coaxially arranged with the input member 102 and the output member 103, and is arranged on the outer side in the radial direction of the pair of input-side engaging portions 107 and the output-side engaging portion 109. The pressed member 104 has a pressed surface 110, which is an annular concave surface, formed around the inner peripheral surface thereof.

Each engaging element 105 of the pair of engaging elements 105 is configured into a substantially semi-circular plate shape, and is arranged on the inner side in the radial direction of the pressed member 104. The engaging element 105 has a pressing surface 111 configured by a partially cylindrical convex surface of the outer-side surface in the radial direction facing the pressed surface 110, and a bottom surface 112 on the inner-side surface in the radial direction. The bottom surface 112 is configured by a flat surface except a part where an output-side engaged portion 114 (described later) is formed. The radius of curvature of the pressing surface 111 is equal to or less than the radius of curvature of the pressed surface 110. Note that the radial direction of the engaging element 105 refers to a direction orthogonal to the bottom surface 112 as indicated by an arrow α in FIG. 21, and the direction parallel to the bottom surface 112 indicated by an arrow ß in FIG. 21 refers to the width direction of the engaging element 105.

In a state in which the pair of engaging elements 105 is arranged on the inner side in the radial direction of the pressed member 104, the inner-diameter dimension of the pressed member 104 and the dimension in the radial direction of the engaging elements 105 are regulated so that there is a gap in at least one of the portions between the pressed surface 110 and the pressing surface 111 and between the bottom surfaces 112.

The engaging element 105 has an input-side engaged portion 113 and an output-side engaged portion 114. The input-side engaged portion 113 is configured by a hole that penetrates in the axial direction through a central portion in the radial direction of the engaging element 105. The input-side engaged portion 113 has a size such that the input-side engaging portion 107 may be loosely inserted therein. Therefore, the input-side engaging portion 107 is able to displace in the direction of rotation of the input member 102 with respect to the engaging element 105, and the engaging element 105 is able to displace in the radial direction of the engaging element 105 with respect to the input-side engaging portion 107. The output-side engaged portion 114 is configured by a concave portion having a substantially rectangular shape that is recessed outward in the radial direction from a central portion in the width direction of the bottom surface 112 of the engaging element 105. The output-side engaged portion 114 has a size such that a front-half portion in the minor axis direction of the output-side engaging portion 109 may be arranged on the inner side thereof.

In the assembled state of the reverse-input blocking clutch 101, the pair of input-side engaging portions 107 of the input members 102 is inserted into the input-side engaged portions 113 of the pair of engaging elements 105 from one side in the axial direction, and the output-side engaging portion 109 of the output member 103 is inserted between the pair of output-side engaged portions 114 from the other side in the axial direction. In other words, the pair of engaging elements 105 is arranged so that the output-side engaging portion 109 is sandwiched from the outer side in the radial direction.

When a rotational torque is input to the input member 102 from the input-side mechanism, as illustrated in FIG. 21, the input-side engaging portions 107 rotate on the inner side of the input-side engaged portions 113 in the direction of rotation of the input members 102. When this occurs, the inner-side surfaces in the radial direction of the input-side engaging portions 107 press the inner surfaces of the input-side engaged portions 113 inward in the radial direction, which causes the pair of engaging elements 105 to move in directions away from the pressed surface 110. As a result, the pair of output-side engaged portions 114 sandwiches the output-side engaging portion 109 of the output member 103 from both sides in the radial direction, and the output-side engaging portion 109 and the pair of output-side engaged portions 114 engage with no looseness. As a result, rotational torque that is input to the input member 102 is transmitted to the output member 103 through the pair of engaging elements 105 and outputted from the output member 103.

On the other hand, as illustrated in FIG. 22, when rotational torque is reversely input to the output member 103 from the output-side mechanism, the output-side engaging portion 109 rotates on the inner side of the pair of output-side engaged portions 114 in the direction of rotation of the output member 103. When this occurs, corner portions of the output-side engaging portion 109 press the bottom surfaces of the output-side engaged portions 114 outward in the radial direction, which causes the pair of engaging elements 105 to respectively move toward the pressed surface 110. As a result, the pressing surfaces 111 of the pair of engaging elements 105 are pressed against the pressed surface 110 of the pressed member 104. As a result, rotational torque that is reversely input to the output member 103 is transmitted to the pressed member 104 that is fixed to another member (not illustrated) and completely blocked and not transmitted to the input member 102, or only a part of the rotational torque reversely input to the output member 103 is transmitted to the input member 102 and the remaining part is blocked.

In order that rotational torque that is reversely input to the output member 103 is completely blocked so as not to be transmitted to the input member 102, the output member 103 is locked by sandwiching the pair of engaging elements 105 between the output-side engaging portion 109 and the pressed member 104 so that the pressing surfaces 111 do not slide with respect to the pressed surface 110. In order that only a part of rotational torque that is reversely input to the output member 103 is transmitted to the input member 102 and the remaining part is blocked, the output member 103 is semi-locked by sandwiching the pair of engaging elements 105 between the output-side engaging portion 109 and the pressed member 104 so that the pressing surfaces 111 slide with respect to the pressed surface 110.

CITATION LIST

Patent Literature

Patent Literature 1: WO 2019/026794

SUMMARY OF INVENTION

Technical Problem

In the case of assembling the reverse-input blocking clutch 101, the output-side engaging portion 109 of the output member 103 is inserted between the output-side engaged portions 114 of the pair of engaging elements 105. From the viewpoint of maintaining workability of the assembly work, it is desirable to regulate the dimensions of the components so that the output-side engaging portion 109 can be inserted somewhat loosely between the output-side engaged portions 114. In this case, gaps are formed between the output-side engaging portion 109 and the output-side engaged portions 114 in a neutral state where no rotational torque is input to both the input member 102 and the output member 103. Therefore, it is inevitable that the output member 103 rattles due to the gaps between the output-side engaging portion 109 and the output-side engaged portions 114.

Looseness that occurs in the output member 103 may not be a problem depending on an application of the reverse-input blocking clutch 101. However, in a case where the reverse-input blocking clutch 101 is applied to applications in which the output member 103 is connected to the screw shaft of the ball screw device and the input member 102 is connected to the electric motor, and the position of a stage fixed to a nut is adjusted or the steering angle of a tire is adjusted, when rotational torque is reversely input to the output member 103 from the stage or the tire through the nut, the position of the stage and the steering angle of the tire may deviate from the adjusted position or an abnormal noise may occur due to looseness of the output member 103.

An object of the present invention is to provide a reverse-input blocking clutch capable of suppressing such looseness of the output member.

Solution to Problem

The reverse-input blocking clutch of one aspect of the present invention includes a pressed member, an input member, an output member, an engaging element, and an elastic member.

The pressed member has a pressed surface around an inner peripheral surface thereof.

The input member has an input-side engaging portion arranged on an inner side in a radial direction of the pressed surface, the input member being coaxially arranged with the pressed surface.

The output member has an output-side engaging portion on the inner side in the radial direction of the pressed surface arranged further on the inner side in the radial direction than the input-side engaging portion, the output member being coaxially arranged with the pressed surface.

The engaging element has a pressing surface facing the pressed surface, an input-side engaged portion engageable with the input-side engaging portion, and an output-side engaged portion engageable with the output-side engaging portion, the engaging element being arranged on the inner side in the radial direction of the pressed surface so as to move in a first direction as a direction away from or toward the pressed surface.

When rotational torque is input to the input member, the engaging element is displaced away from the pressed surface based on engagement between the input-side engaging portion and the input-side engaged portion, engages the output-side engaged portion with the output-side engaging portion, and transmits the rotational torque input to the input member to the output member. When rotational torque is reversely input to the output member, the engaging element engages the output-side engaging portion with the output-side engaged portion, pressing the pressing surface against the pressed surface, and frictionally engages the pressing surface with the pressed surface.

The elastic member is elastically held between the output-side engaging portion and the engaging element so as to press the output-side engaging portion to a side far from the pressed surface in the first direction and press the engaging element to a side closer to the pressed surface in the first direction.

The elastic member includes an elastic pressing portion arranged at a position deviated in an axial direction with respect to the output-side engaged portion with regard to the axial direction of the pressed surface at a position overlapping the output-side engaging portion with regard to the first direction, and the elastic pressing portion is elastically pressed against the output-side engaging portion.

In one aspect of the present invention, the elastic pressing portion is arranged at positions deviated to both sides in the axial direction with respect to the output-side engaged portion in the axial direction of the pressed surface.

In one aspect of the present invention, the elastic member is elastically held between the output-side engaging portion and the engaging element without being fixed to either the output member or the engaging element.

In one aspect of the present invention, displacement of the elastic member in a direction orthogonal to the first direction is regulated based on engagement with the engaging element.

In one aspect of the present invention, the elastic member is configured by a leaf spring.

In one aspect of the present invention, the leaf spring of the elastic member has a first through hole passing through in the first direction at a location aligned with the output-side engaged portion.

The elastic pressing portion is arranged on both sides of the first through hole in the axial direction of the pressed surface.

In one aspect of the present invention, the engaging element has a first convex portion inserted through the first through hole, and displacement of the elastic member with regard to the axial direction of the pressed surface and/or displacement of the elastic member in a second direction orthogonal to both the first direction and the axial direction of the pressed surface are regulated based on engagement between the first through hole and the first convex portion inserted through the first through hole.

In one aspect of the present invention, the leaf spring of the elastic member has a second through hole passing through in the first direction at a location deviated from the first through hole in the second direction orthogonal to both the first direction and the axial direction of the pressed surface, and the engaging element has a second convex portion inserted through the second through hole, and displacement of the elastic member in the axial direction of the pressed surface and/or displacement of the elastic member in the second direction are regulated based on engagement between the second through hole and the second convex portion inserted through the second through hole.

In one aspect of the present invention, the engaging element includes only one body plate having the pressing surface and the output-side engaged portion.

In one aspect of the present invention, the engaging element has the body plate and a link member arranged adjacent to the body plate in the axial direction.

The body plate has a pivot-support portion located on a side closer to the pressed surface than the input-side engaging portion with regard to the first direction.

The link member has the input-side engaged portion and a pivot-supported portion pivotably supported by the pivot-support portion.

When a rotational torque is input to the input member, the engaging element moves away from the pressed surface by the pivot-supporting portion being pulled by the input-side engaging portion through the link member, causing the output-side engaged portion to engage with the output-side engaging portion, and transmits the rotational torque input to the input member to the output member.

In one aspect of the present invention, the link member is configured by a pair of link members provided to hold the body plate from both sides in the axial direction.

In one aspect of the present invention, the pivot-support portion is configured by a plate-side through hole provided in the body plate, and the pivot-supported portion is configured by a link-side through hole provided in the link member.

The engaging element has a pivot-support shaft inserted through the plate-side through hole and the link-side through hole.

In one aspect of the present invention, the engaging element is configured by a pair of engaging elements arranged so as to hold the output-side engaging portion from both sides in the radial direction.

The input-side engaging portion of the input member is configured by a pair of input-side engaging portions.

In one aspect of the present invention, a reinforcing member that spans between tip-end portions of the pair of input-side engaging portions is provided.

Advantageous Effect of Invention

With the present invention, a reverse-input blocking clutch capable of suppressing looseness in the output member is provided.

BRIEF DESCRIPTION OF DRAWINGS

FIG. 13(A) is a plan view, FIG. 13(B) is a front view as viewed from underneath in FIG. 13(A), and FIG. 13(C) is a perspective view.

FIG. 15(A)(a) is a view of a construction of the first example, illustrating an engaging portion between the engaging element and the input-side engaging portion in a state before rotational torque is input to the input member, FIG. 15(A)(b) is a view illustrating a state after rotational torque is input to the input member from the state illustrated in FIG. 15(A)(a), FIG. 15(B)(a) is a view of a construction of a reference example which corresponds to a conventional construction, illustrating the engagement portion between the engaging element and the input-side engaging portion in a state before rotational torque is input to the input member, and FIG. 15(B)(b) is a view illustrating a state after rotational torque is input to the input member from the state illustrated in FIG. 15(B)(a).

DESCRIPTION OF EMBODIMENTS

First Example

Figure 1:
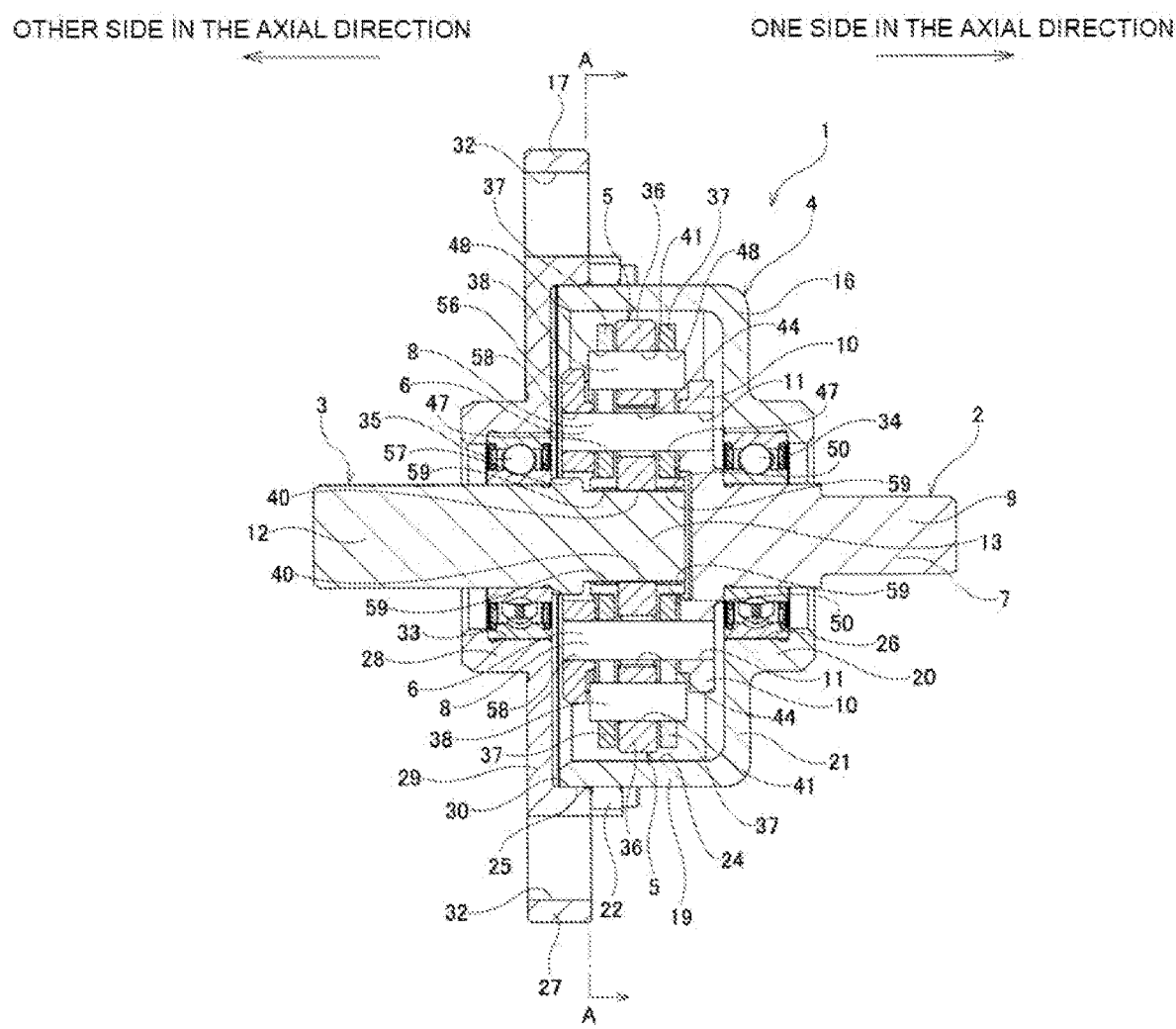
FIG. 1 is a cross sectional view of a reverse-input blocking clutch of a first example of an embodiment of the present invention.

A first example of an embodiment of the present invention will be described using FIGS. 1 to 16.

In the description below, the axial direction, the radial direction, and the circumferential direction refer to, unless stated otherwise, the axial direction, the radial direction, and the circumferential direction of the reverse-input blocking clutch 1, more specifically, of the pressed surface of the pressed member of the reverse-input blocking clutch 1 (pressed surface 24 of the outer-diameter-side tubular portion 19 of the housing 4). In this example, the axial direction, the radial direction, and the circumferential direction of the reverse-input blocking clutch 1 coincide with the axial direction, the radial direction, and the circumferential direction of the input member 2 and the axial direction, the radial direction, and the circumferential direction of the output member 3. Regarding the reverse-input blocking clutch 1, one side in the axial direction is the right side in FIGS. 1, 3, 7, 8, 9, and 10, and the other side in the axial direction is the left side in FIGS. 1, 3, 7, 8, 9, and 10.

The reverse-input blocking clutch 1 of this example includes an input member 2, an output member 3, a housing 4 which is a pressed member, a pair of engaging elements 5 as an engaging element, and a pair of elastic members 50 as an elastic member. The reverse-input blocking clutch 1 transmits rotational torque input to the input member 2 to the output member 3, but has a reverse input blocking function that does not transmit rotational torque reversely input to the output member 3, alternatively, transmits only part of the rotational torque and blocks the rest.

Figure 3:
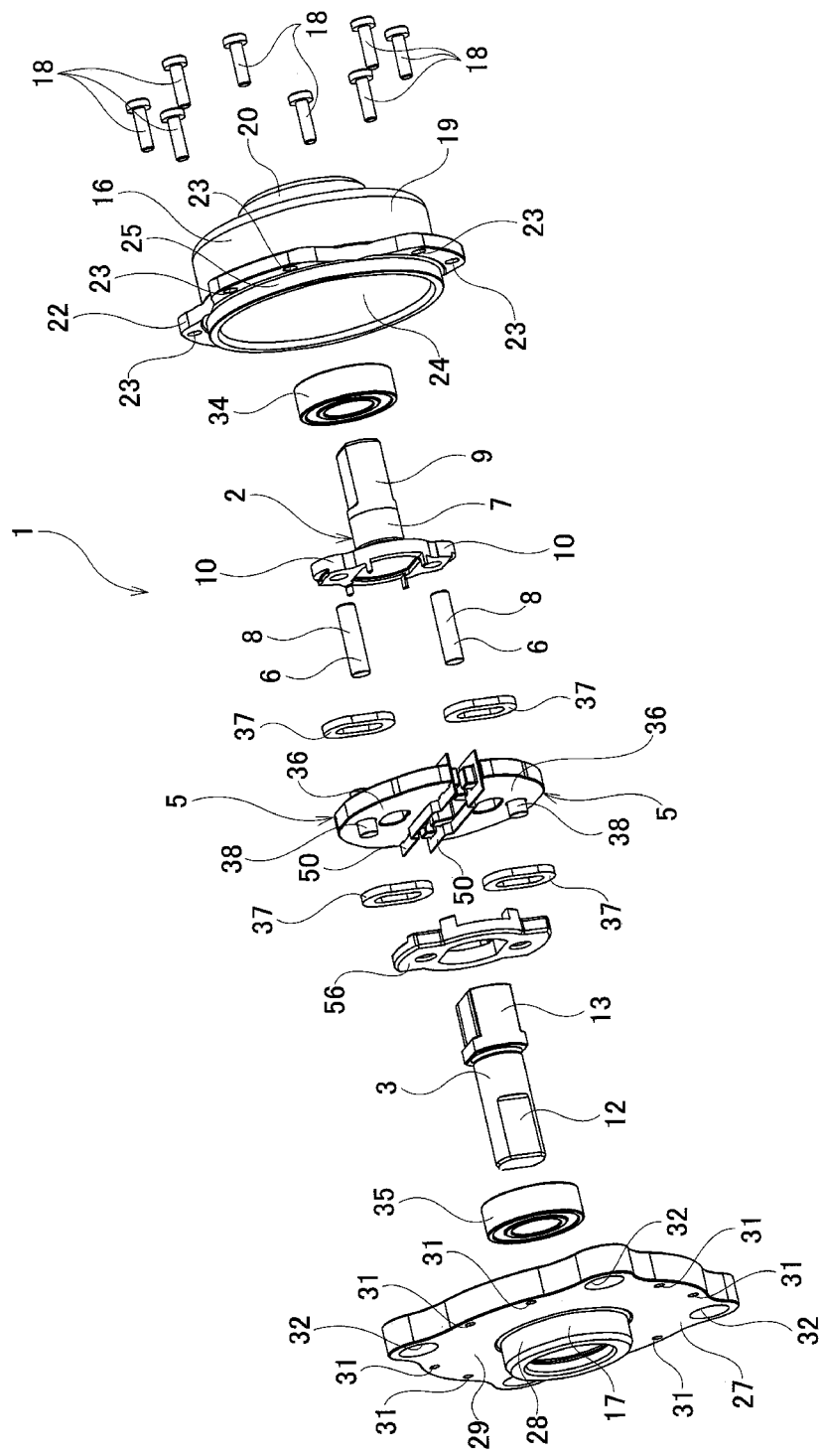
FIG. 3 is an exploded perspective view of the reverse-input blocking clutch of the first example.
Figure 8:
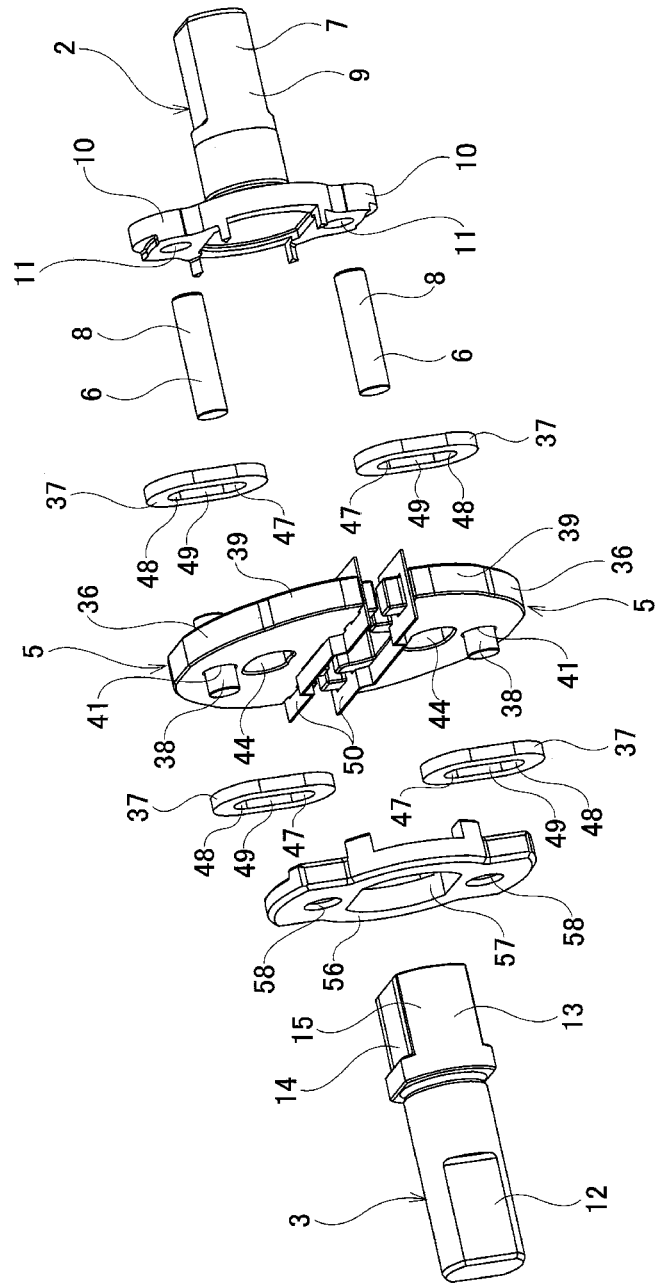
FIG. 8 is an exploded perspective view of the reverse-input blocking clutch of the first example with the housing, the input-side bearing, and the output-side bearing removed.

The input member 2 is connected to an input-side mechanism such as an electric motor, and receives rotational torque. The input member 2 of this example has a pair of input-side engaging portions 6 as an input-side engaging portion. In a case of implementing the present invention, the input member 2 can be configured by combining a plurality of parts, or can be integrally configured as a whole, that is, by one part. In this example, the input member 2 is configured by combining a shaft member 7 and a pair of input-side engaging pins 8, as illustrated in FIGS. 1, 3, and 8.

The shaft member 7 has an input shaft portion 9 and a pair of input arm portions 10.

The input shaft portion 9 is configured in a substantially cylindrical shape, and an end portion on the one side in the axial direction thereof is connected to the output portion of the input-side mechanism.

The pair of input arm portions 10 extend from an end portion on the other side in the axial direction of the input shaft portion 9 toward opposite sides in the radial direction. Each input arm portion 10 of the pair of input arm portions 10 has a support hole 11, which is a through hole in the axial direction provided at the central portion in the radial direction.

Each input-side engaging pin 8 of the pair of input-side engaging pins 8 is configured by a cylindrical pin. An end portion on the one side in the axial direction of the input-side engaging pin 8 is pressure fitted and fixed inside the support hole 11 of the input arm portion 10. In this example, the input-side engaging portion 6 is configured by the central portion in the axial direction and an end portion on the other side in the axial direction of the input-side engaging pin 8.

In this example, the input arm portion and the input-side engaging portion are configured by a pair of input arm portions 10 and a pair of input-side engaging portions 6 according to the number of engaging elements to be described later, that is, according to the fact that the engaging element is configured by a pair of engaging elements. However, in a case of implementing the present invention, the number of the input arm portions and the input-side engaging portions is not limited to two, and the number of the input arm portions and the input-side engaging portions can also be set to one, or three or more, depending on the number of the engaging elements.

Figure 4:
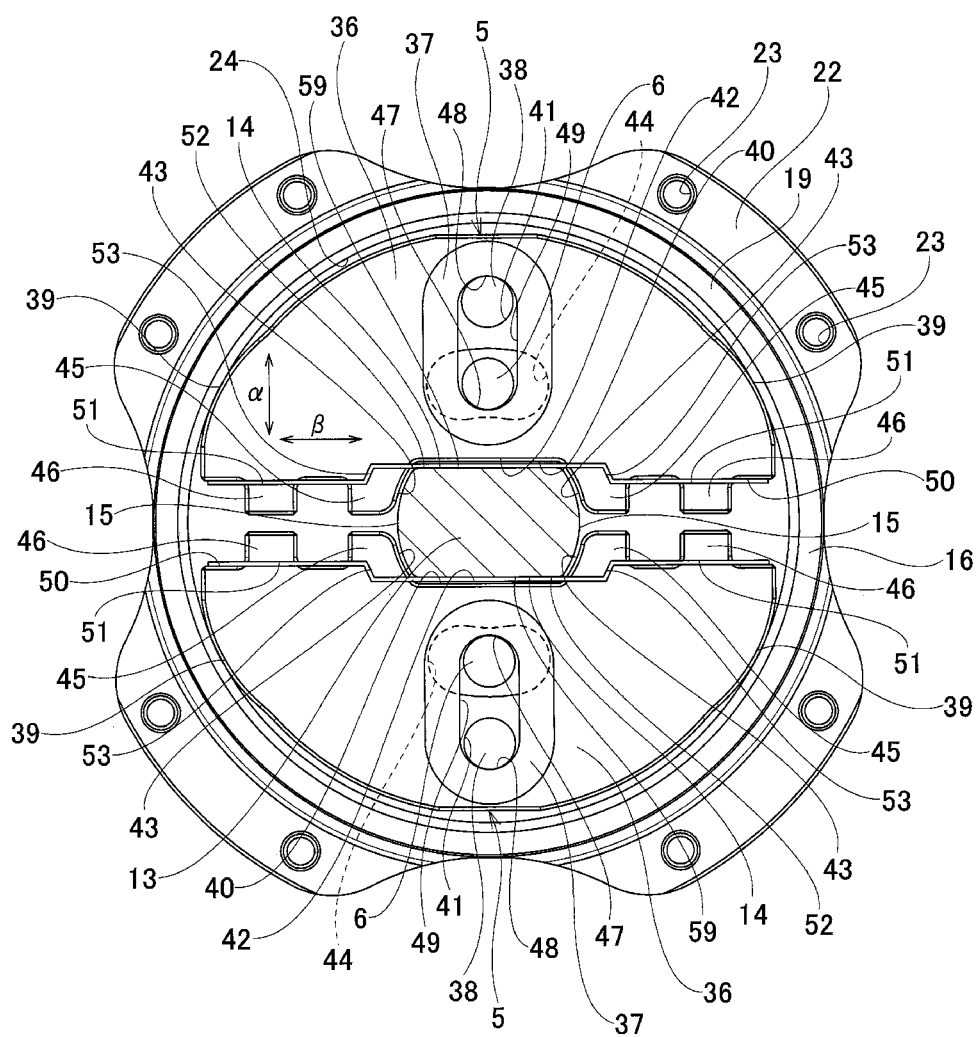
FIG. 4 is a view of the reverse-input blocking clutch of the first example with some parts omitted as seen from the left side in FIG. 1, with the output-side engaging portion cut along A-A in FIG. 1, in a neutral state where no rotational torque is input to either the input member or the output member.

The output member 3 is connected to an output-side mechanism such as a speed-reducing mechanism, and outputs rotational torque. The output member 3 is arranged coaxially with the input member 2, and has an output-shaft portion 12 and an output-side engaging portion 13 as illustrated in FIGS. 3 and 4. In a case of implementing the present invention, the output member 3 can be configured by combining a plurality of parts, or can be integrally configured as a whole, that is, by one part. In this example, the output member 3 is configured by one part.

The output-shaft portion 12 is configured in a substantially cylindrical shape, and the end portion on the other side in the axial direction thereof is connected of the input portion of the output-side mechanism.

The output-side engaging portion 13 has a substantially elliptical columnar shape, and extends from a central portion of an end surface on the one side in the axial direction of the output-shaft portion 12 to the one side in the axial direction.

The outer peripheral surface of the output-side engaging portion 13, as illustrated in FIGS. 4 to 6, 16(A), and 16(B), has side surfaces 14 on both sides in the minor axis direction (vertical direction in FIGS. 4 to 6, 16(A), and 16(B)), and guide surfaces 15 configured by side surfaces on both sides in the major axis direction (horizontal direction in FIGS. 4 to 6, FIG. 16(A), and FIG. 16(B)). The guide surfaces 15 are arranged on both sides of the side surfaces 14, and in this example, the guide surfaces 15 of the side surfaces 14 on both sides are continuous in the minor axis direction and are each configured by one curved surface.

Each side surface 14 is a flat surface orthogonal to the minor axis direction of the output-side engaging portion 13. Each guide surface 15 is a curved surface. Specifically, the guide surface 15 is configured by a partially cylindrical convex surface that is centered on the center axis of the output-side engaging portion 13 (center axis of the output member 3). Therefore, regarding the output member 3, the outer peripheral surface of a round bar material, for example, can be used for the guide surfaces 15, and the processing cost can be suppressed accordingly. However, in a case of implementing the present invention, each of the guide surfaces may be a partially cylindrical convex surface centered on an axis parallel to the center axis of the output member 3, or may be non-cylindrical shaped convex surface such as partially elliptical shaped convex surface or the like. The output-side engaging portion 13 is arranged further on the inner side in the radial direction than the pair of input-side engaging portions 6, and more specifically, is arranged in a portion between the pair of input-side engaging portions 6.

In this example, according to the number of engaging elements described later, in other words, according to the fact that engaging element is configured by a pair of engaging elements, the side surfaces and the guide surfaces arranged on both sides thereof are configured by a pair of side surfaces 14 and guide surfaces 15 on both sides of each side surface 14. However, in a case of implementing the present invention, the number of the side surfaces is not limited to two, and it can also be set to one, or three or more, depending on the number of the engaging elements.

Figure 2:
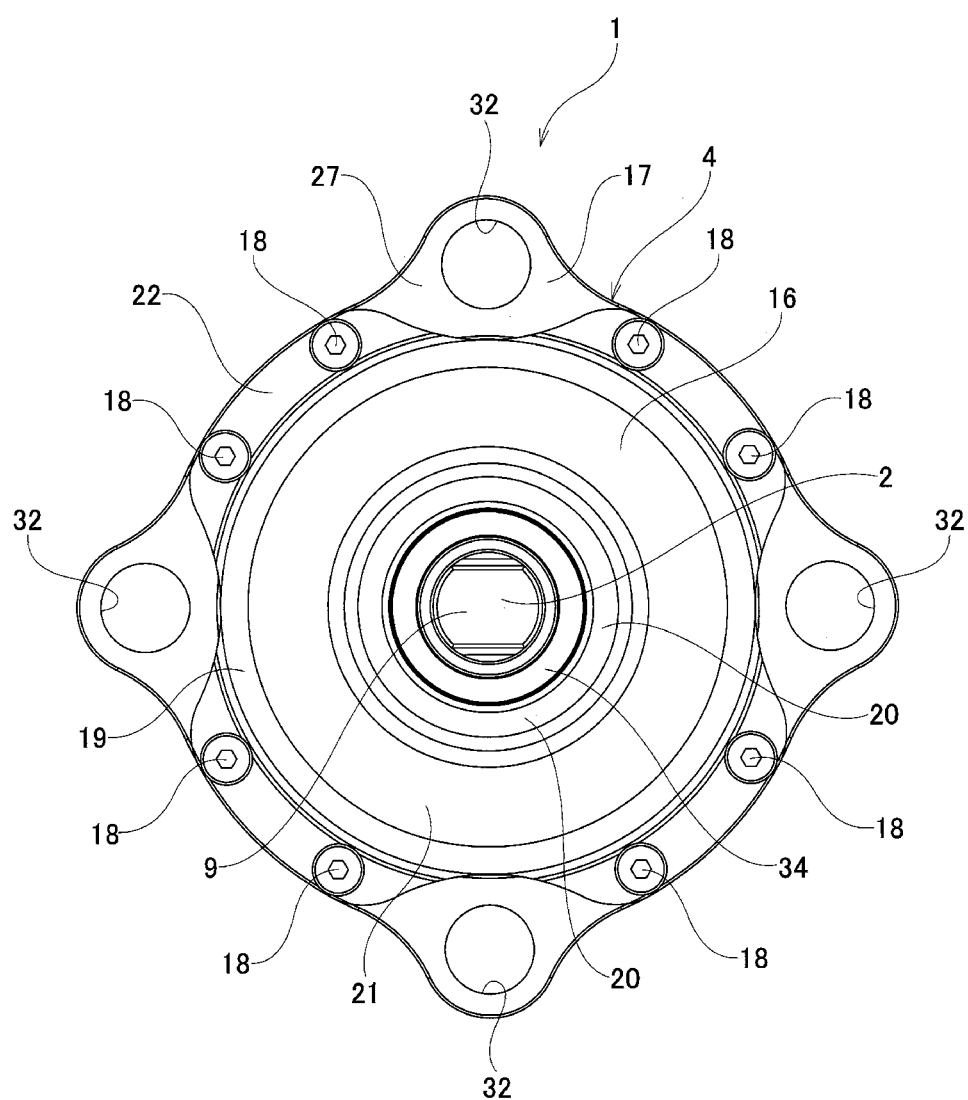
FIG. 2 is a view of the reverse-input blocking clutch of the first example as seen from the right side of FIG. 1.

The housing 4, as illustrated in FIGS. 1 and 2, is formed into a hollow circular disk shape, and is fixed to another member (not illustrated) so that the rotation of the housing 4 is restricted. The housing 4 is coaxially arranged with the input member 2 and the output member 3, and houses the pair of input-side engaging portions 6, the output-side engaging portion 13, the pair of engaging elements 5 and the like on the inner side thereof. The housing 4 is configured by coupling together an input-side housing element (main housing body) 16 arranged on the one side in the axial direction and an output-side housing element (housing cover) 17 arranged on the other side in the axial direction by bolts 18.

The input-side housing element 16 includes an annular outer-diameter-side tubular portion 19, an annular inner-diameter-side tubular portion 20, a hollow circular plate-shaped side plate portion 21, and a flange portion 22. The inner-diameter-side tubular portion 20 is coaxially arranged with the outer-diameter-side tubular portion 19 on the one side in the axial direction of the outer-diameter-side tubular portion 19. An end outer-side portion in the radial direction of the side plate portion 21 is connected to an end portion on the one side in the axial direction of the outer-diameter-side tubular portion 19, and an end portion on the inner side in the radial direction of the side plate portion 21 is connected to an end portion on the other side in the axial direction of the inner-diameter-side tubular portion 20. The flange portion 22 protrudes toward the outer side in the radial direction from the central portion in the axial direction of the outer-diameter-side tubular portion 19. The flange portion 22 has through holes 2 passing through in the axial direction at locations in the circumferential direction (eight locations in the illustrated example).

The outer-diameter-side tubular portion 19 has a pressed surface 24 around the inner peripheral surface thereof. The pressed surface 24 is configured by a cylindrical surface centered on the center axis of the input-side housing element 16. The outer-diameter-side tubular portion 19 has an input-side in-row fitting surface 25 around the outer peripheral surface of the end portion on the other side in the axial direction, which is a portion located on the other side in the axial direction relative to the flange portion 22. The input-side in-row fitting surface 25 is configured by a cylindrical surface centered on the center axis of the input-side housing element 16. The inner-diameter-side tubular portion 20 has an input-side bearing fitting surface 26 in a portion from the end portion on the other side in the axial direction to the central portion of the inner peripheral surface. The input-side bearing fitting surface 26 is configured by a cylindrical surface centered on the center axis of the input-side housing element 16. In other words, the pressed surface 24, the input-side in-row fitting surface 25, and the input-side bearing fitting surface 26 are arranged coaxially with each other.

The output-side housing element 17 includes a flange portion 27 having a hollow circular plate shape, an inner-diameter-side tubular portion 28 having an annular shape, and a side plate portion 29 having a hollow circular plate shape. The inner-diameter-side tubular portion 28 is coaxially arranged with the flange portion 27 on the other side in the axial direction of the flange portion 27. An end outer-side portion in the radial direction of the side plate portion 29 is connected to the end portion on the other side in the axial direction of the flange portion 27, and an end portion on the inner side in the radial direction of the side plate portion 29 is connected to an end portion on the one side in the axial direction of the inner-diameter-side tubular portion 28.

The flange portion 27 has an output-side in-row fitting surface 30 around the inner peripheral surface of a portion on the one side in the axial direction. The output-side in-row fitting surface 30 is configured by a cylindrical surface centered on the center axis of the output-side housing element 17. The output-side in-row fitting surface 30 has an inner-diameter dimension capable of fitting with the input-side in-row fitting surface 25 of the input-side housing element 16 without looseness. The flange portion 27 has screw holes 31 at a plurality of locations in the circumferential direction (eight locations in the illustrated example) at an end portion on the inner side in the radial direction that are aligned with the through holes 23 of the input-side housing element 16. The flange portion 27 has mounting holes 32 passing through in the axial direction at a plurality of locations in the circumferential direction (in the illustrated example, four locations that are evenly spaced in the circumferential direction) at the central portion in the radial direction. The mounting holes 32 are used for inserting mounting members for fixing the assembled housing 4 to another member (not illustrated). The inner-diameter-side tubular portion 28 has an output-side bearing fitting surface 33 in a portion from the end portion on the one side to the central portion in the axial direction of the inner peripheral surface. The output-side bearing fitting surface 33 is configured by a cylindrical surface centered on the center axis of the output-side housing element 17. In other words, the output-side in-row fitting surface 30 and the output-side bearing fitting surface 33 are coaxially arranged with each other.

The housing 4 is assembled by coupling and fixing the input-side housing element 16 and the output-side housing element 17 together by screwing the bolts 18 that are inserted through the through holes 23 of the input-side housing element 16 into the screw holes 31 of the output-side housing element 17 and further tightening in a state where the input-side in-row fitting surface 25 of the input-side housing element 16 is fitted with the output-side in-row fitting surface 30 of the output-side housing element 17 so there is no looseness and the side surface on the other side in the axial direction of the flange portion 22 of the input-side housing element 16 is in contact with the side surface on the one side in the axial direction of the flange portion 27 of the output-side housing element 17.

In this example, the input-side in-row fitting surface 25 and the input-side bearing fitting surface 26 of the input-side housing element 16 are coaxially arranged with each other, and the output-side in-row fitting surface 30 and the output-side bearing fitting surface 33 of the output-side housing element 17 are coaxially arranged with each other. Therefore, in the assembled state of the housing 4 in which the input-side in-row fitting surface 25 is fitted without looseness with the output-side in-row fitting surface 30, the input-side bearing fitting surface 26 and the output-side bearing fitting surface 33 are coaxially arranged with each other.

In the assembled state of the housing 4, the input shaft portion 9 of the input member 2 is rotatably supported by an input-side bearing 34, which is an additional component of this example, so as to be able to rotate with respect to the input-side bearing fitting surface 26 of the input-side housing element 16. Moreover, the output-shaft portion 12 of the output member 3 is rotatably supported by an output-side bearing 35, which is an additional component of this example, so as to be able to rotate with respect to the output-side bearing fitting surface 33 of the output-side housing element 17. As a result, the input member 2 and the output member 3 are coaxially arranged with each other, and coaxially arranged with the pressed surface 24 of the housing 4. Furthermore, in this state, the pair of input-side engaging portions 6 and the output-side engaging portion 13 are arranged on the inner side in the radial direction of the pressed surface 24 of the housing 4.

Regarding the reverse-input blocking clutch 1, in a case where it is desired to increase the performance level of switching from a locked state or semi-locked state (described later) to an unlocked state (lock releasing performance) or the like, it is necessary that the coaxiality and inclination of the input member 2 and the output member 3 be strictly managed. In such a case, it is possible to apply methods of common bearing usage such as changing both the input-side bearing 34 and the output-side bearing 35 from single-row rolling bearings as illustrated in the drawings to double-row rolling bearings. In a case of implementing the present invention, the input-side bearing may be omitted if the coaxiality of the input member with respect to the pressed surface is ensured. Further, the output-side bearing may be omitted if the coaxiality of the output member with respect to the pressed surface is ensured.

Each engaging element 5 of the pair of engaging elements 5 has a pressing surface 39 facing the pressed surface 24, an input-side engaged portion 47 that can be engaged with the input-side engaging portion 6, and an output-side engaged portion 40 that can be engaged with the output-side engaging portion 13. The engaging element 5 is arranged on the inner side in the radial direction of the pressed surface 24 so as to be able to move in a first direction which is a direction away from or toward the pressed surface 24 (a direction that connects the center axis of the reverse-input blocking clutch 1 and the central portion in the circumferential direction of the outer-side surface in the radial direction of the engaging elements 5, in other words, vertical direction indicated by arrow α in FIG. 4). The engaging element 5 includes only one body plate 36 having the pressing surface 39 and the output-side engaged portion 40. The pair of engaging elements 5 is arranged so as to sandwich the output-side engaging portion 13 from both sides in the radial direction. In this example, the number of the engaging elements 5 is two, and each of the engaging elements 5 is arranged so as to be able to move in the first direction with respect to the pressed surface 24. However, in a case of implementing the present invention, the number of the engaging elements can also be set to one, or three or more, as long as the pressing surface 39 of the engaging element 5 is arranged so as to be able to move in the first direction with respect to the pressed surface 24. Since the relationship between each engaging element 5 of the pair of engaging elements 5, the pressed surface 24, the input-side engaging portions 6, and the output-side engaging portion 13 and their functions are common, in the following description, from the viewpoint of simplifying the explanation, only one of the engaging elements 5 will be described except for the explanation regarding the arrangement of the engaging elements 5.

In this example, the engaging element 5 includes a body plate 36, a pair of link members 37, and a pivot-support shaft 38.

In this example, the body plate 36 has a substantially semi-circular plate shape. In this example, the thickness dimension of the body plate 36 is smaller than the dimension in the axial direction of the output-side engaging portion 13. The body plate 36 includes a pair of pressing surfaces 39 facing the pressed surface 24, an output-side engaged portion 40, and a pivot-support portion 41.

In this example, the outer peripheral surface of the body plate 36 is configured by an outer-side surface in the radial direction having a convex arc shape that corresponds to the arc of the body plate 36, and an inner-side surface in the radial direction having a crank shape that corresponds to the chord of the body plate 36. Note that the radial direction of the body plate 36 refers to the vertical direction in FIGS. 4 to 6 orthogonal to the chord of the body plate 36, and refers to a direction away from or toward the body plate 36 with respect to the pressed surface 24. Moreover, the width direction of the body plate 36 refers to the horizontal direction indicated by arrow β in FIG. 5 that is parallel to the chord of the body plate 36, and refers to a direction orthogonal to both the radial direction of the body plate 36 and the axial direction of the pressed surface 24. In this example, the radial direction of the body plate 36 corresponds to the first direction that is the direction of movement of the body plate 36 of the engaging element 5 when moving away from or toward the pressed surface 24. Furthermore, in this example, the width direction of the body plate 36 corresponds to the second direction that is orthogonal to both the first direction and the axial direction of the pressed surface 24.

The pair of engaging elements 5 is arranged on the inner side in the radial direction of the pressed surface 24 in a state in which the outer-side surfaces in the radial direction of the body plates 36 are faced toward the opposite sides and the inner-side surfaces in the radial direction of the body plates 36 are faced to each other. In this state, the inner-diameter dimension of the pressed surface 24 and the dimension in the radial direction of the body plates 36 are regulated so that there is a gap in at least one of a portion between the pressed surface 24 and the outer-side surfaces in the radial direction of the body plates 36 and a portion between the inner-side surfaces in the radial direction of the body plates 36 that allows the body plates 36 to move in the radial direction.

The pair of pressing surfaces 39 is provided at two locations so as to be separated in the circumferential direction of the outer-side surface in the radial direction of the body plate 36. The pair of pressing surfaces 39, in the locked state or semi-locked state of the output member 3, is a portion that is pressed against the pressed surface 24. Each pressing surface 39 of the pair of pressing surfaces 39 protrudes further toward the pressed surface 24 than portions of the outer-side surface in the radial direction of the body plate 36 that are separated from the pressing surface 39 in the circumferential direction. The pressing surface 39 is configured by a partially cylindrical shaped convex surface having a radius of curvature that is smaller than the radius of curvature of the pressed surface 24. A portion of the outer-side surface in the radial direction of the body plate 36 that is located between the pair of pressing surfaces 39 in the circumferential direction is a non-contact surface that does not come in contact with the pressed surface 24.

Figure 5:
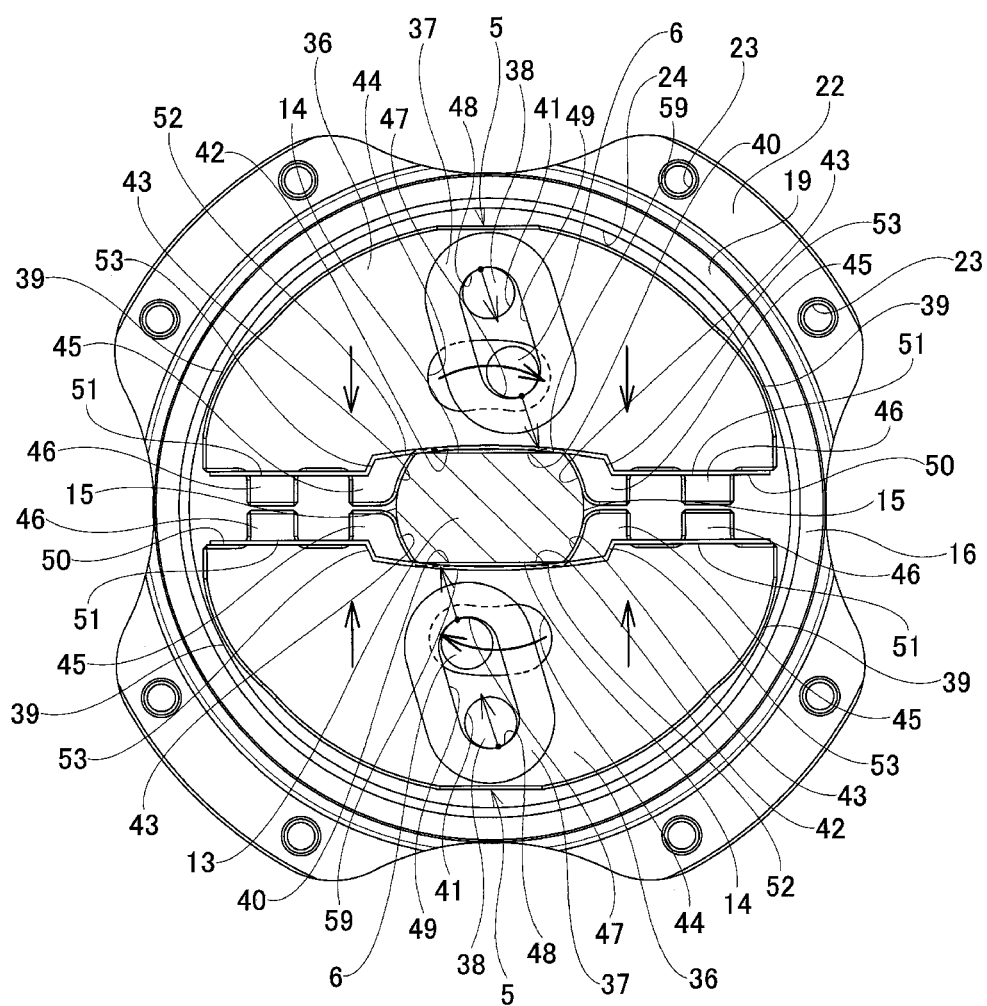
FIG. 5 is a view similar to FIG. 4 and illustrates a state where rotational torque is input to the input member.
Figure 6:
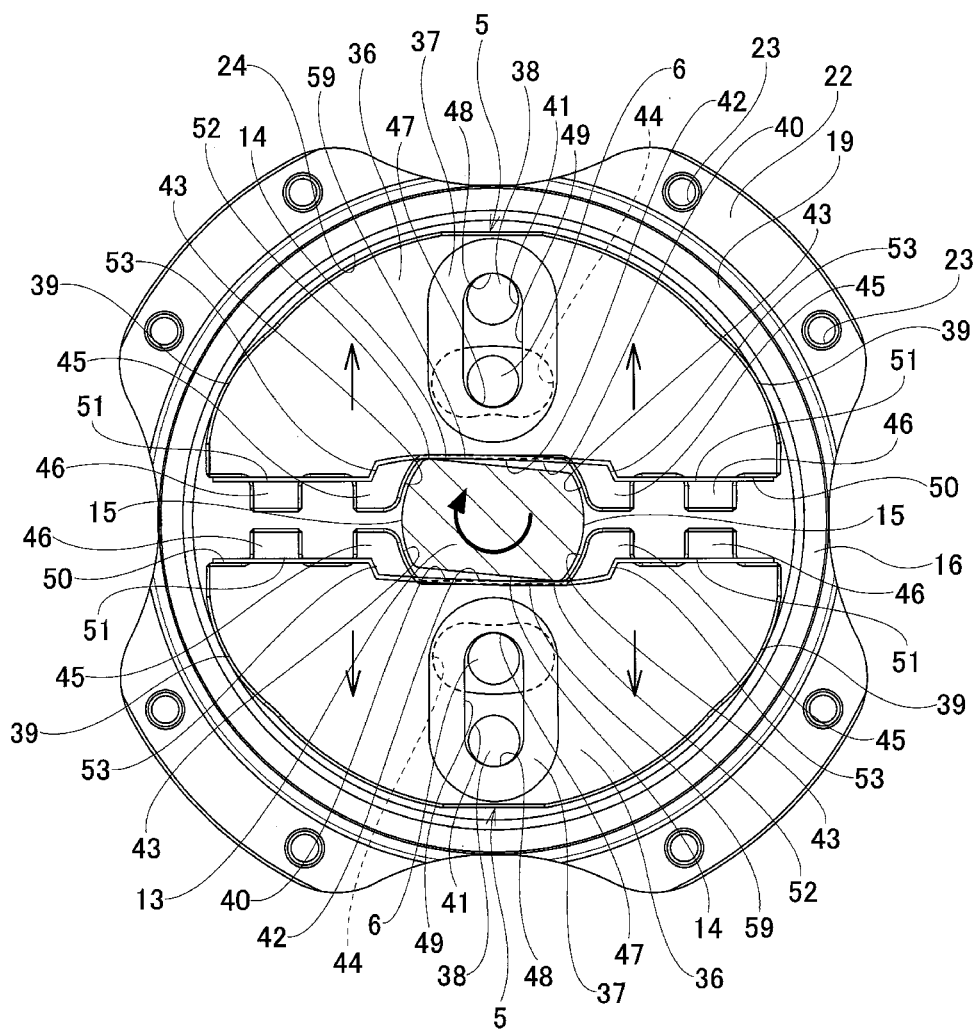
FIG. 6 is a view similar to FIG. 4 and illustrates a state where rotational torque is reversely input to the output member.
Figure 7:
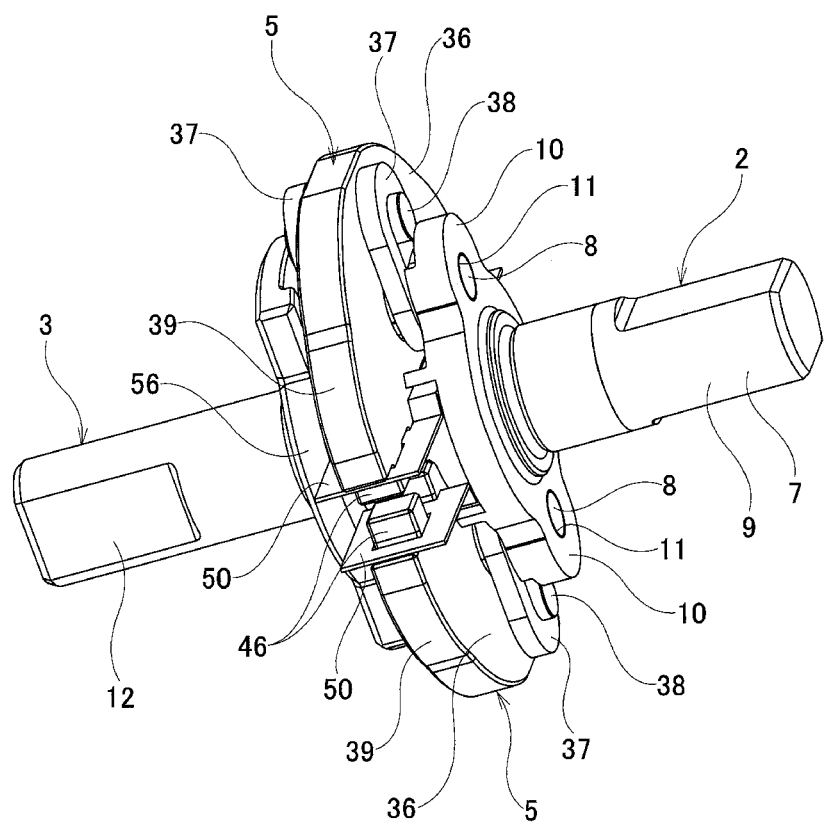
FIG. 7 is a perspective view of the reverse-input blocking clutch of the first example with a housing, an input-side bearing, and an output-side bearing removed.

The output-side engaged portion 40 is configured by a concave portion provided on a side surface of the body plate 36 that is away from the pressed surface 24. More specifically, the output-side engaged portion 40 is configured by a concave portion having a substantially rectangular shape that is recessed outward in the radial direction at the central portion in the width direction of the inner-side surface in the radial direction of the body plate 36. As illustrated in FIGS. 4 to 6, the pair of engaging elements 5 is arranged so as to sandwich the output-side engaging portion 13 from the outer sides in the radial direction by the output-side engaged portions 40.

As illustrated in FIGS. 4 to 6, FIG. 16(A), and FIG. 16(B), the output-side engaged portion 40 has a size such that the front-half portion in the minor axis direction of the output-side engaging portion 13 can be arranged on the inner side thereof. As in FIG. 4 for example, the front-half portion in the minor axis direction of the output-side engaging portion 13 is the upper half of the output-side engaging portion 13 with respect to the engaging element 5 arranged on the upper side and the lower half of the output-side engaging portion 13 with respect to the engaging element 5 arranged on the lower side. In particular, in this example, as illustrated in FIGS. 5 and 16(B), the output-side engaged portion 40 has an inner surface shape that coincides with the outer peripheral surface of the front-half portion in the minor axis direction of the output-side engaging portion 13.

The inner surface of the output-side engaged portion 40 has a bottom surface 42 and a pair of guided surfaces 43 arranged on both sides of the bottom surface 42. The bottom surface 42 is configured by a flat surface that is orthogonal to the radial direction of the body plate 36. The guided surfaces 43 are arranged on the end portions on both sides of the inner surface of the output-side engaged portion 40 in the width direction of the body plate 36, and face each other in the width direction. The guided surfaces 43 are configured by concave curved surfaces that are inclined in directions such that the distance between the guided surfaces 43 increases as going toward the inner side in the radial direction of the body plate 36, or in other words, as going in a direction in the radial direction of the body plate 36 away from the pressed surface 24.

The guided surfaces 43 are able to come in contact with the guide surfaces 15 of the output-side engaging portion 13, and are configured by partially cylindrical concave surfaces that respectively have a radius of curvature that is the same as that of each of the guide surfaces 15, or respectively have a radius of curvature that is slightly larger than that of the guide surface 15. In other words, in this example, as illustrated in FIGS. 5 and 16(B), the output-side engaged portion 40 has an inner-surface shape that coincides with the outer peripheral surface of the front-half portion in the minor axis direction of the output-side engaging portion 13. That is, the bottom surface 42 of the output-side engaged portion 40 can be brought into surface contact with the side surface 14 of the output-side engaging portion 13, and the guided surfaces 43 of the output-side engaged portion 40 can be brought into surface contact with the guide surfaces 15 of the output-side engaging portion 13. Note that in a case of implementing the present invention, the guided surfaces may be configured by non-cylindrical shaped concave surfaces such as partial elliptical tubular shape or the like.

The pivot-support portion 41 is provided in an outer-side portion in the radial direction of the central portion in the width direction of the body plate 36. The pivot-support portion 41 is a portion that pivotably supports the link member 37 through the pivot-support shaft 38. In this example, the pivot-support portion 41 is configured by a circular hole corresponding to a plate-side through hole passing through in the axial direction of an outer-side portion in the radial direction of the central portion in the width direction of the body plate 36.

The body plate 36 further includes an insertion hole 44 in an inner-side portion in the radial direction of the central portion in the width direction. The insertion hole 44 is configured by an arc-shaped long hole that penetrates in the axial direction through an inner-side portion in the radial direction of the central portion in the width direction of the body plate 36, and that extends in the circumferential direction. The input-side engaging portions 6 is inserted into the insertion hole 44. The insertion hole 44 has a size that allows the input-side engaging portion 6 to be loosely inserted therein. Specifically, when the input-side engaging portion 6 is inserted into the inner side of the insertion hole 44, there is a gap in the circumferential direction and a gap in the radial direction of the body plate 36 between the input-side engaging portion 6 and the inner surface of the insertion hole 44. Therefore, the input-side engaging portion 6 is able to displace in the direction of rotation of the input member 2 with respect to the insertion hole 44 (body plate 36) due to the existence of the gap in the circumferential direction, and the insertion hole 44 (body plate 36) is able to displace in the radial direction of the body plate 36 with respect to the input-side engaging portion 6 due to the existence of the gap in the radial direction of the body plate 36. In other words, the size of the insertion hole 44 is regulated so that operation is not hindered due to interference between the inner peripheral edge of the insertion hole 44 and the input-side engaging portion 6 during operation of the reverse-input blocking clutch 1 which will be described later.

Figure 10:
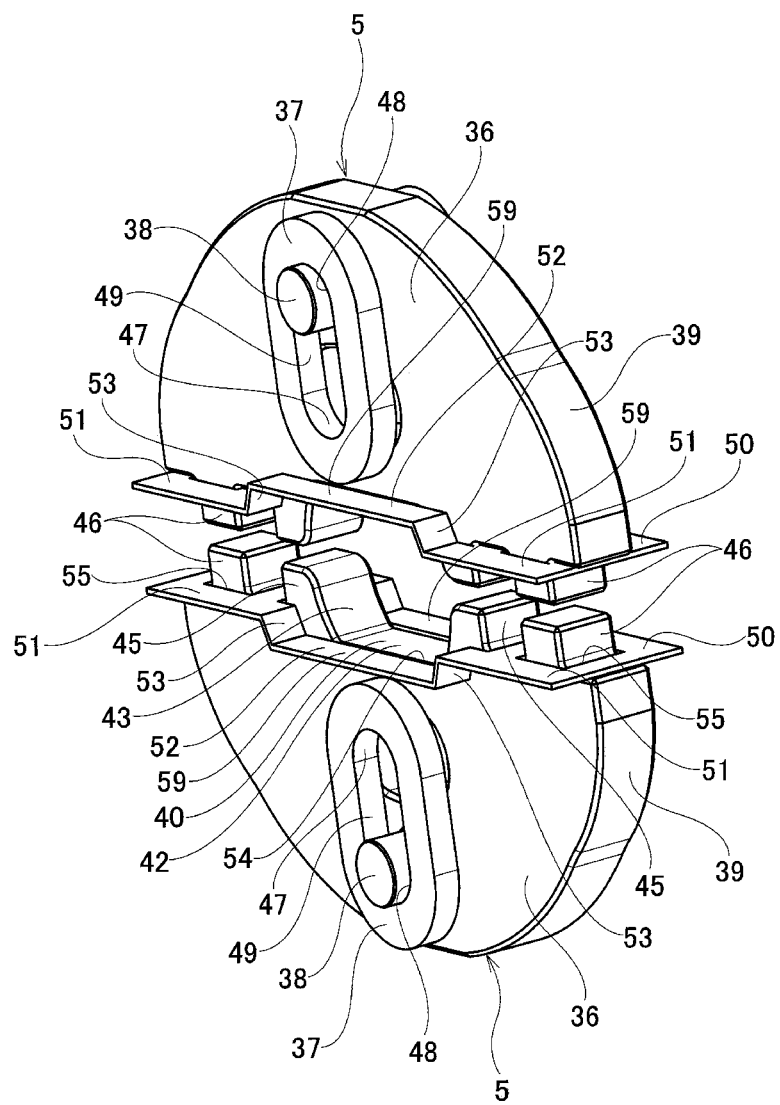
FIG. 10 is a perspective view of a pair of engaging elements each having an elastic member incorporated therein, which configures the reverse-input blocking clutch of the first example.

As particularly illustrated in FIG. 10, the body plate 36 has first convex portions 45 protruding toward the inner side in the radial direction at locations sandwiching the output-side engaged portion 40 from both sides in the width direction in the central portion in the width direction of the inner-side surface in the radial direction of the body plate 36. The body plate 36 has second convex portions 46 protruding toward the inner side in the radial direction in portions on both sides in the width direction of the inner-side surface in the radial direction of the body plate 36, which are located on the outer side in the width direction of the first convex portions 45.

The pair of link members 37 is arranged so as to sandwich the body plate 36 from both sides in the axial direction and so that each of the link members 37 is adjacent in the axial direction to the body plate 36. However, in a case of implementing the present invention, it is also possible to arrange only one link member on only one side in the axial direction of the body plate 36.

Each of the link members 37 is a press-molded part that is made by punching a metal plate such as steel plate or the like by press working, and has a substantially oblong plate shape. The link member 37 has an input-side engaged portion 47 in an inner-side portion in the radial direction of the body plate 36, which is a one-side portion in the lengthwise direction of the link member 37, and has a pivot-supported portion 48 in an outer-side portion in the radial direction of the body plate 36, which is the other-side portion in the lengthwise direction of the link member 37. Particularly, in the construction of this example, the link members 37 has a long hole 49 that extends in the lengthwise direction. The input-side engaged portion 47 is configured by an end portion on one side in the lengthwise direction of the long hole 49. The pivot-supported portion 48 is configured by a link-side through hole which is an end portion on the other side in the lengthwise direction of the long hole 49. However, in a case of implementing the present invention, it is also possible to configure the input-side engaged portion by a circular hole passing through in the axial direction of the link member, and to configure the pivot-supported portion by a link-side through hole which is a circular hole passing through in the axial direction of the link member.

The input-side engaging portion 6 is inserted through the input-side engaged portion 47. As a result, a one-side portion in the lengthwise direction of the link member 37 is pivotably connected to the input-side engaging portion 6.

The pivot-support shaft 38 has a cylindrical shape, and is inserted through the pivot-support portion 41 of the body plate 36 and the pivot-supported portions 48 of the link members 37. As a result, the other-side portions in the lengthwise direction of the link members 37 are pivotably supported by the pivot-support portion 41 of the body plate 36 through the pivot-support shaft 38. In this example, the central portion in the axial direction of the pivot-support shaft 38 is fitted with a loose with into the pivot-support portion 41 of the body plate 36 so as to relatively rotate, and portions on both sides in the axial direction are fitted into the pivot-supported portions 48 of the link members 37 so as to relatively rotate. The central portion in the axial direction of the pivot-support shafts 38 may also be fitted into the pivot-support portion 41 of the body plate 36 by press fitting so as not to relatively rotate.

In a case of implementing the present invention, the pivot-support portion of the body plate may be configured by a cylindrical protrusion and the pivot-supported portion of the link member may be configured by a hole into which the cylindrical protrusion is fitted so as to be able to relatively rotate. Alternatively, the pivot-supported portion of the link member may be configured by a cylindrical protrusion and the pivot-support portion of the body plate may be configured by a hole into which the cylindrical protrusion is fitted so as to relatively rotate.

Figure 14:
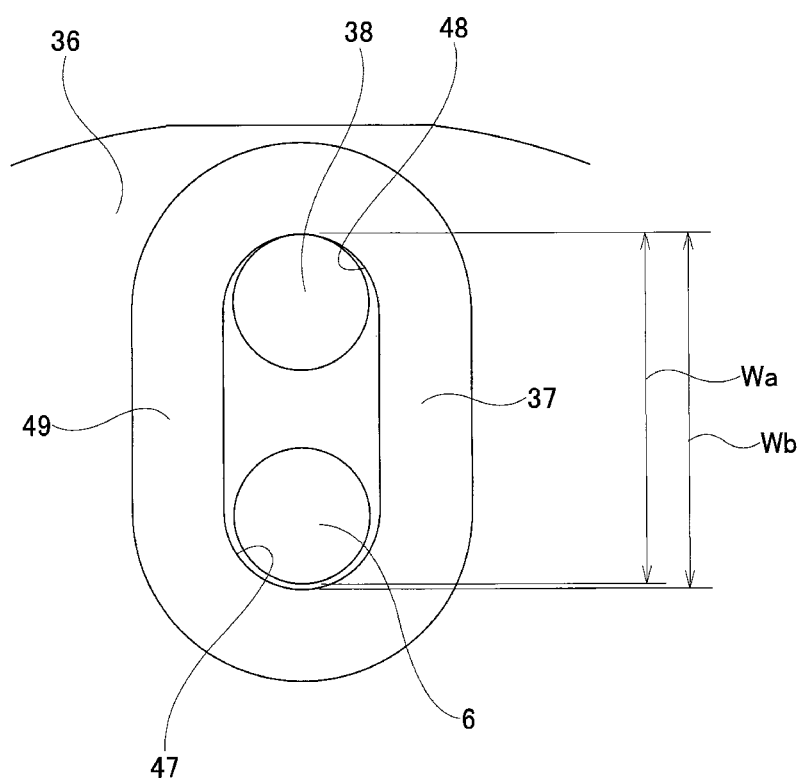
FIG. 14 is an enlarged view of a central portion in the horizontal direction of the upper half portion of FIG. 4.
Figure 16:
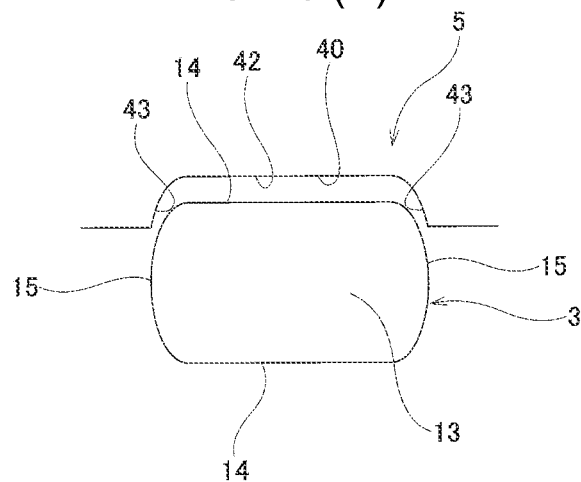
FIGS. 16(A) and 16(B) are views of the reverse-input blocking clutch of the first example, illustrating states before and after the output-side engaging portion and the output-side engaged portion are engaged.
Figure 16:
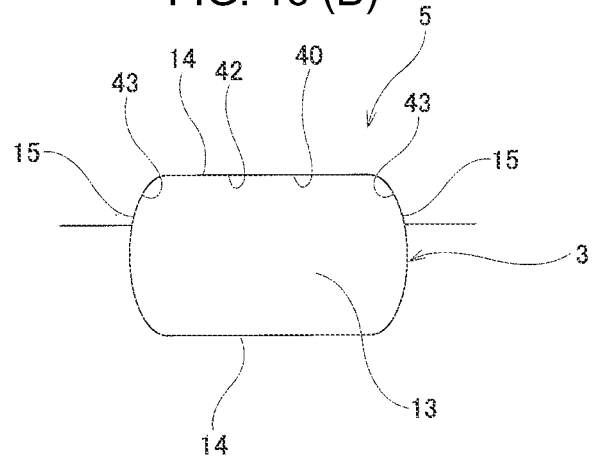

In this example, as illustrated in FIGS. 4 and 6, in a state in which the pair of pressing surfaces 39 of the engaging element 5 comes in contact with the pressed surface 24 and the input-side engaging portion 6 is located in a central portion in the width direction of the body plate 36, as illustrated in FIG. 14, the distance Wa between the end edges of the pivot-support shaft 38 and the input-side engaging portion 6 that are on the far sides from each other is set to be equal to or less than the distance Wb between the end edges of the pivot-supported portion 48 and the input-side engaged portion 47 that are on the far sides from each other (Wa≤Wb). The difference Wb−Wa between the distance Wa and the distance Wb is preferably as large as possible from the viewpoint of simplifying assembly of the reverse-input blocking clutch 1. On the other hand, however, the difference Wb−Wa is preferably as small as possible from the viewpoint of being able to achieve an unlocked state by causing the engaging element 5 to immediately move inward in the radial direction when rotational torque is input to the input member 2 as will be described later.

In all usage states (operating states) including a neutral state (state illustrated in FIG. 4) in which rotational torque is not applied to either the input member 2 or the output member 3, each elastic member 50 of the pair of elastic members 50 is elastically held between the output-side engaging portion 13 and the engaging element 5 so as to press the output-side engaging portion 13 toward the far side from the pressed surface 24 in the first direction, in other words, toward the inner side in the radial direction, and presses the engaging element 5 toward the side closer to the pressed surface 24 in the first direction, in other words, toward the outer side in the radial direction.

That is, in all usage states including a neutral state, the elastic member 50 is held between the engaging element 5 and the output-side engaging portion 13 so that a part (in this example, portions on both sides in the width direction of the body plate 36) is pressed toward the inner side in the radial direction by the engaging element 5, and the other part (in this example, the central portion in the width direction of the body plate 36) is pressed toward the outer side in the radial direction by the output-side engaging portion 13, and the reaction force presses the engaging element 5 toward the outer side in the radial direction, and presses the output-side engaging portion 13 toward the inner side in the radial direction.

In all usage states including the neutral state, the elastic member 50 presses the engaging element 5 toward the outer side in the radial direction so as to press the pressing surface 39 of the engaging element 5 against the pressed surface 24. The reason why the pressing surface 39 of the engaging element 5 is pressed against the pressed surface 24 particularly in the neutral state is to achieve a locked state immediately when rotational torque is reversely input to the output member 3.

The elastic member 50 includes an elastic pressing portion 59 arranged at a position separated on both sides in the axial direction with respect to the output-side engaged portion 40 of the body plate 36 in the axial direction of the pressed surface 24, and elastically presses the elastic pressing portion 59 against the output-side engaging portion 13.

The elastic member 50 is not fastened to either the output member 3 or the engaging element 5, but is elastically held between the output-side engaging portion 13 and the engaging element 5. However, in a case of implementing the present invention, the elastic member may be fastened to the engaging element or may be fastened to the output member. In a case of fastening the elastic member, it is possible to use various conventionally known fastening means such as screws, crimping, welding, or the like.

In this example, as illustrated in FIGS. 4, 10, and 13(A) to 13(C), the elastic member 50 is configured by a leaf spring. The elastic member 50 is arranged so as to extend in the width direction of the body plate 36 corresponding to the second direction. In this example, the elastic member 50 has a crank-shape. In this example, the dimension $W_{50}$ in the plate width direction (vertical direction in FIG. 13(A)) of the elastic member 50 is larger than the thickness dimension of the body plate 36 and smaller than the dimension in the axial direction of the output-side engaging portion 13.

In this example, the elastic member 50 includes a support plate portion 51, a pressing plate portion 52, and a connecting plate portion 53. The support plate portion 51 has a long plate shape and is arranged on both side portions in the extending direction of the elastic member 50. The pressing plate portion 52 has a long plate shape and is substantially parallel to the support plate portion 51, and is arranged at the central portion in the extending direction of the elastic member 50. The connecting plate portion 53 connects an end portion of the support plate portion 51 and an end portion of the pressing plate portion 52 that are adjacent to each other in the length direction of the elastic member 50. The connecting plate portions 53 are arranged non-parallel to each other, and are inclined in directions away from the pressing plate portion 52 in the extending direction of the elastic member 50 as going away from the pressing plate portion 52 in the plate thickness direction of the support plate portions 51 and the pressing plate portion 52.

In a case of implementing the present invention, various shapes may be adopted for the shape of the elastic member according to the arrangement relationship between the engaging element and the output-side engaging portion and the construction of the bottom surface. In other words, various shapes may be adopted for the elastic member as long as the elastic member is elastically held between the output-side engaging portion and the engaging element in all usage states including a neutral state so as to press the output-side engaging portion in the first direction toward the side away from the pressed surface and press the engaging element in the first direction toward the side closer to the pressed surface. In this case, the pressing force applied from the elastic member to the output-side engaging portion may be directed to the side away from the pressed surface in the first direction as a whole, and the pressing force applied from the elastic member to the engaging element may be directed to the side closer to the pressed surface in the first direction as a whole. In other words, as long as these conditions are satisfied, the pressing force applied from the elastic member to the respective portions of the output-side engaging portion and the pressing force applied from the elastic member to the respective portions of the engaging element need not be directed in the first direction.

The elastic member 50 has a first through hole 54 at the central portion in the width direction of the body plate 36 (horizontal direction in FIGS. 13(A) and 13(B)) corresponding to the position aligned with the output-side engaged portion 40 that extends in the width direction and passes through in the radial direction of the body plate 36 (front-back direction of the paper in FIG. 13(A), vertical direction in FIG. 13(B)) corresponding to the first direction. In this example, the elastic pressing portions 59 are arranged on both sides of the first through hole 54 in the axial direction of the pressed surface 24 (vertical direction in FIG. 13(A), front-back direction of the paper in FIG. 13(B)). In this example, the elastic member 50 has second through holes 55 that pass through the body plate 36 in the radial direction thereof at portions sandwiching the first through hole 54 from both sides in the width direction corresponding to positions separated from the first through hole 54 in the width direction of the body plate 36 corresponding to the second direction.

In this example, the first through hole 54 has a rectangular shape extending in the width direction of the body plate 36 as illustrated in FIG. 13(A) when viewed in the radial direction of the body plate 36. The first through hole 54 is provided so as to pass through the pressing plate portion 52, the connecting plate portions 53, and end portions of the support plate portions 51 on the side closer to the pressing plate portion 52. As can be seen from the fact that the first through hole 54 is arranged at a position aligned with the output-side engaged portion 40, the first through hole 54 is a portion for preventing direct engagement between the output-side engaging portion 13 and the output-side engaged portion. Each of the second through holes 55 has a rectangular shape as illustrated in FIG. 13(A) when viewed in the radial direction of the body plate 36. The second through holes 55 are provided so as to respectively pass through the central portion of each of the support plate portions 51 in the width direction of the body plate 36.

In this example, the elastic member 50 is assembled to the inner-side portion in the radial direction of the body plate 36. In this state, the first convex portions 45 of the body plate 36 are inserted into the first through hole 54 of the elastic member 50 without looseness, the second convex portions 46 of the body plate 36 are inserted into the second through holes 55 of the elastic member 50 without looseness, the outer-side surface in the radial direction of the central portion in the plate width direction of the support plate portions 51 of the elastic member 50 come into contact with portions adjacent to both sides of the second convex portions 46 in the width direction of the body plate 36 among the inner-side surface in the radial direction of the body plate 36, and both side portions in the plate width direction of the elastic member 50 protrude toward both sides in the axial direction of the body plate 36.

In this example, based on the engagement between the elastic member 50 and the engaging element 5, in other words, based on engagement between the first through hole 54 and the first convex portions 45 and engagement between the second through holes 55 and the second convex portions 46, displacement of the elastic member 50 in a direction orthogonal to the radial direction corresponding to the first direction, in other words, displacement in the axial direction of the pressed surface 24 and displacement in the width direction of the body plate 36 corresponding to the second direction is regulated. Further, displacement of the elastic member 50 toward the outer side in the radial direction is regulated based on the fact that the outer-side surfaces in the radial direction of the support plate portions 51 come into contact with portions adjacent to both sides of the second convex portions 46 in the width direction of the body plate 36 among the inner-side surface in the radial direction of the body plate 36.

In a case of implementing the present invention, displacement of the elastic member 50 in a direction orthogonal to the radial direction corresponding to the first direction may also be regulated based on only of the engagement between the first through hole 54 and the first convex portion 45 and the engagement between the second through hole 55 and the second convex portion 46.

The pressing plate portions 52 of the elastic member 50 are arranged so as to straddle the output-side engaged portion 40 when viewed in the axial direction of the pressed surface. In other words, the central portions in the length direction of the pressing plate portions 52 are arranged at the same positions as the output-side engaged portion 40 with regard to the width direction of the body plate 36 corresponding to the second direction. In this example, both side portions in the plate width direction of the pressing plate portions 52, in other words, both side portions of the pressing plate portion 52 sandwiching the first through hole 54 in the plate width direction correspond to the pair of elastic pressing portions 59. The pair of elastic pressing portions 59 is arranged at portions separated on both sides in the axial direction with respect to the body plate 36. In a free state of the elastic member 50, the pair of elastic pressing portions 59 is located on the inner side in the radial direction of the bottom surface 42 of the output-side engaged portion 40, and arranged substantially parallel to the bottom surface 42.

Particularly, as illustrated in FIG. 4, in a neutral state in which the elastic member 50 is arranged between the output-side engaging portion 13 and the engaging element 5 and no rotational torque is applied to the input member 2 and the output member 3, the elastic pressing portions 59 come into surface contact with the side surface 14 of the output-side engaging portion 13 and is slightly flexurally deformed toward outer side in the radial direction. Therefore, the elastic member 50 is elastically held between the output-side engaging portion 13 and the engaging element 5. As a result, the support plate portion 51 elastically presses the inner-side surface in the radial direction of the body plate 36 toward the outer side in the radial direction and the elastic pressing portion 59 elastically presses the side surface 14 of the output-side engaging portion 13 toward the inner side in the radial direction.

As will be described later, when rotational torque is input to the input member 2 (see FIG. 5) and when rotational torque is reversely input to the output member 3 (see FIG. 6), the elastic member 50 elastically deforms so as to bend the elastic pressing portion 59 toward the outer side in the radial direction, allowing the output-side engaging portion 13 and the output-side engaged portion 40 to directly engage.

The reverse-input blocking clutch 1 of this example includes a reinforcing member 56 that spans between the tip end portions of the input-side engaging portions 6 of the pair of input-side engaging portions 6 of the input member 2, in other words, between the end portions on the other side in the axial direction of the pair of input-side engaging pins 8.

Figure 9:
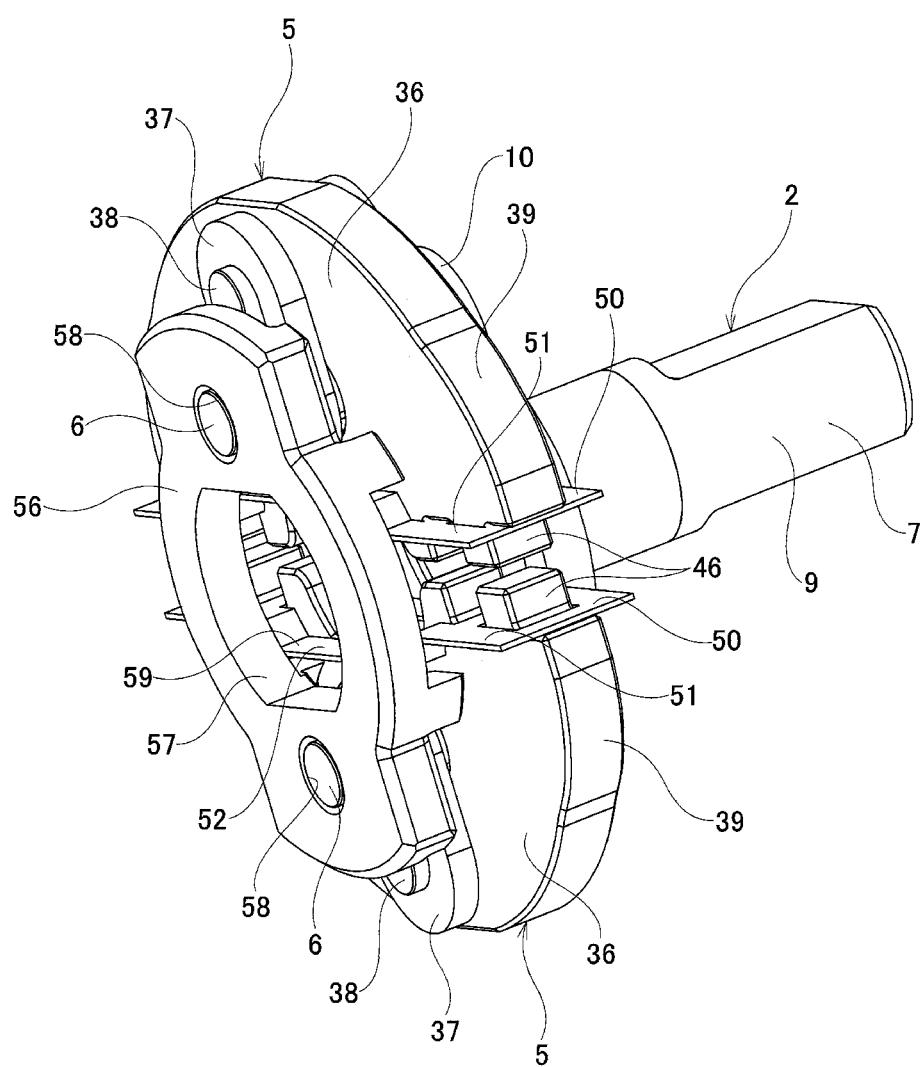
FIG. 9 is a perspective view of the reverse-input blocking clutch of the first example with the housing, the output member, the input-side bearing, and the output-side bearing removed.
Figure 11:
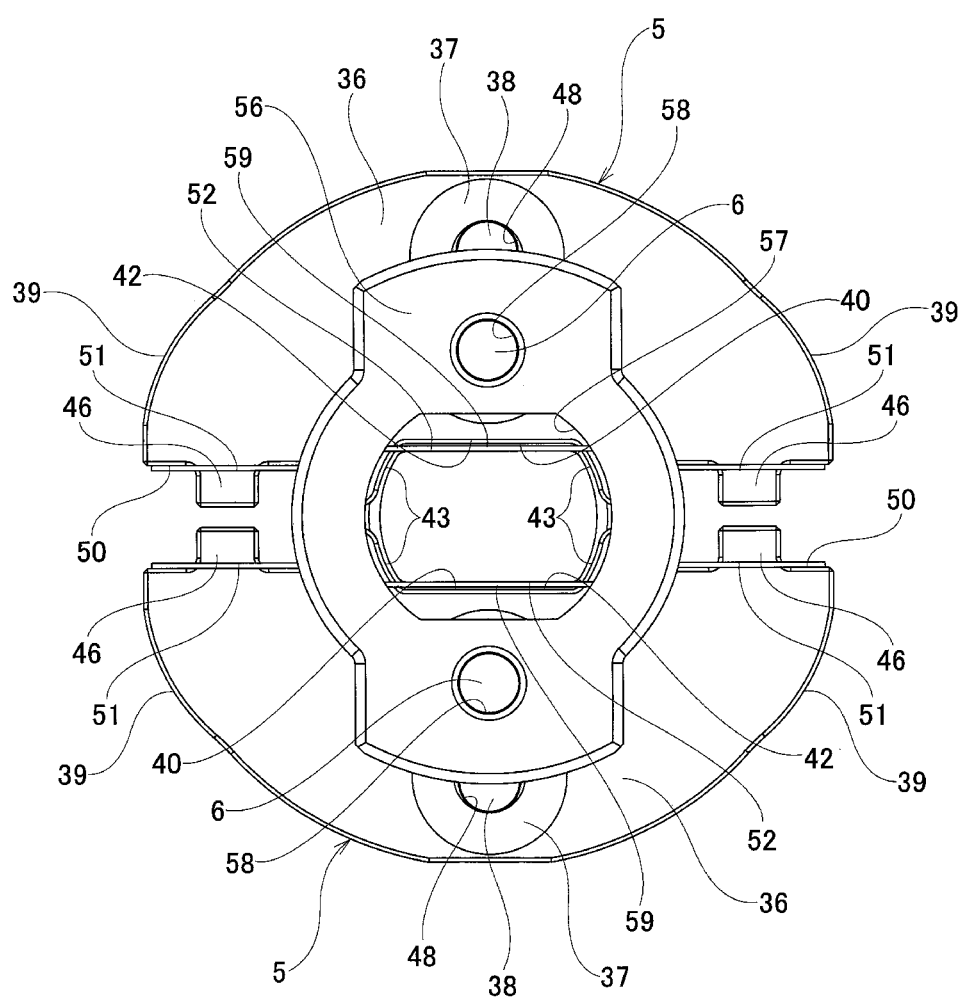
FIG. 11 is a view of the pair of engaging elements each having the elastic member incorporated therein and a reinforcing member of the reverse-input blocking clutch of the first example, as viewed from the output member side with regard to the axial direction.
Figure 12:
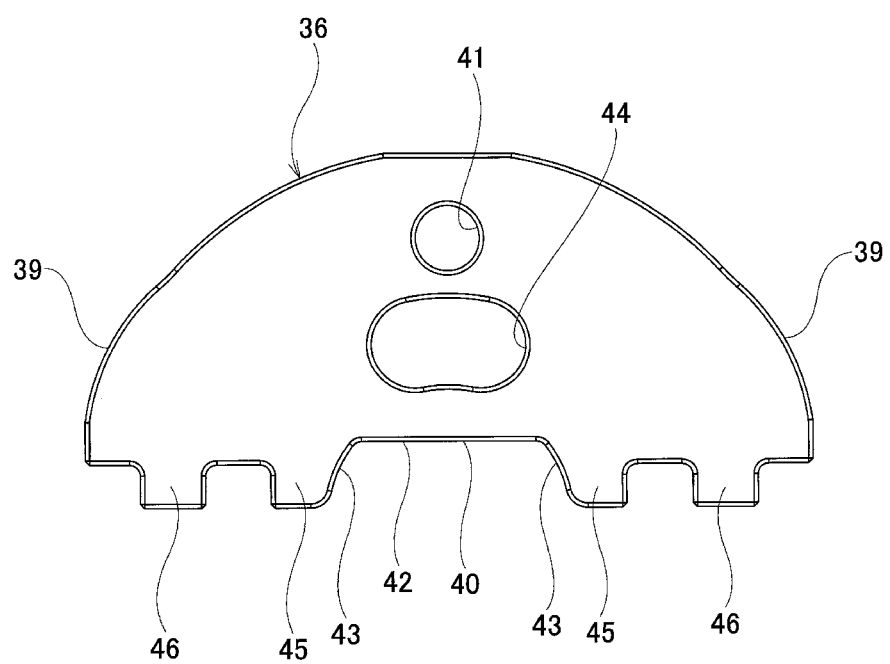
FIG. 12 is a view of a body plate of the engaging element of the reverse-input blocking clutch of the first example as viewed from the axial direction.
Figure 13:
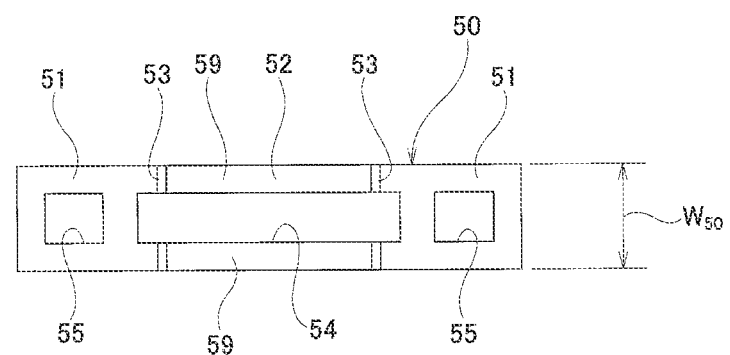
FIG. 13 is a view illustrating an elastic member of the reverse-input blocking clutch of the first example. Specifically.
Figure 13:
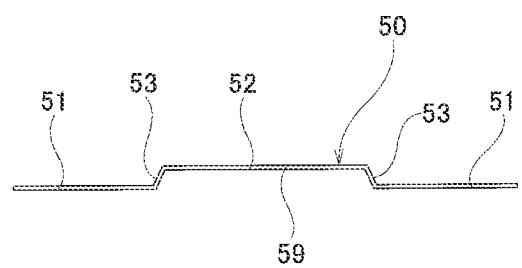
Figure 13:
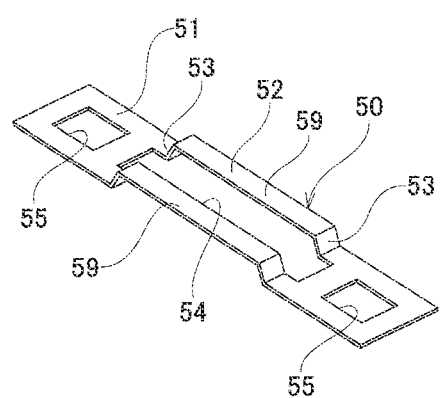

As illustrated in FIGS. 8, 9, and 11, the reinforcing member 56 has a substantially rectangular plate shape as a whole. The reinforcing member 56 includes an insertion hole 57 having a substantially oblong opening shape in the central portion thereof, and includes support holes 58 in portions sandwiching the insertion hole 57 from both sides in the minor axis direction of the insertion hole 57.

The output-side engaging portion 13 is inserted into the insertion hole 57. The insertion hole 57 has a size that allows the output-side engaging portion 13 to be loosely inserted. Therefore, the output-side engaging portion 13 can rotate inside the insertion hole 57 relative to the insertion hole 57 (reinforcing member 56).

Each of the support holes 58 has an inner-diameter dimension slightly smaller than the outer-diameter dimension of the tip-end portion of the input-side engaging portion 6. The reinforcing member 56 spans between the tip-end portions of the pair of input-side engaging portions 6 by press-fitting the tip-end portions into the support holes 58 of the reinforcing member 56.

In the construction of this example, a pair of engaging elements 5 and a pair of elastic members 50 are arranged between the input arm portions 10 which are parts of the input member 2 and the reinforcing member 56 in the axial direction. As a result, the positions in the axial direction of the pair of engaging elements 5 and the pair of elastic members 50 are regulated between the input arm portions 10 of the input member 2 and the reinforcing member 56.

Specifically, in this state, the side surface on the other side in the axial direction of the input arm portion 10 is brought into sliding contact with or brought to closely face the side surface on the one side in the axial direction of the pivot-support shaft 38 and the side surface on the one side in the axial direction of the link member 37 on the one side in the axial direction. As a result, the pivot-support shaft 38 is prevented from coming off from the pivot-support portion 41 of the body plate 36 to the one side in the axial direction, and the link member 37 on the one side in the axial direction is prevented from coming off from the pivot-support shaft 38 to the one side in the axial direction.

Further, the side surface on the one side in the axial direction of the reinforcing member 56 is brought into sliding contact with or brought to closely face the side surface on the other side in the axial direction of the pivot-support shaft 38 and the side surface on the other side in the axial direction of the link member 37 on the other side in the axial direction. As a result, the pivot-support shaft 38 is prevented from coming off from the pivot-support portion 41 of the body plates 36 to the other side in the axial direction, and the link member 37 on the other side in the axial direction is prevented from coming off from the pivot-support shaft 38 to the other side in the axial direction.

However, in a case of implementing the present invention, it is also possible to prevent the link member from coming off from the pivot-support shaft by a retaining ring or the like that is fitted at the end portion in the axial direction of the pivot-support shaft.

In the construction of this example, the pair of engaging elements 5 and the pair of elastic members 50 are not strongly held from both sides in the axial direction by the input arm portions 10 of the input member 2 and the reinforcing member 56. Accordingly, the input arm portions 10 of the input member 2 and the reinforcing member 56 do not interfere the radial movement of the engaging elements 5 and the elastic members 50 and the pivotal movement of the link members 37.

In a case of implementing the present invention, as long as the positions in the axial direction of the pair of engaging elements 5 and the pair of elastic members 50 can be regulated and the radial movement of the engaging elements 5 and the elastic members 50 and the pivotal movement of the link members 37 are not interfered as described above, both end portions in the axial direction of the input-side engaging pins may be fitted inside the support holes provided on the input arm portions and the reinforcing member respectively without interference. In this case, the input-side engaging pin may be prevented from coming off by a retaining ring fitted at the end portion of the input-side engaging pin, the inner surface of the housing, and the like.

In a case of implementing the present invention, regulating the positions in the axial direction of the elastic members 50 may also be performed only by the input arm portions 10 of the input member 2 and the reinforcing member 56. In this case, an engagement construction between the elastic member and the engaging element for regulating the position in the axial direction of the elastic member may be omitted.

Next, the operation of the reverse-input blocking clutch 1 of this example will be described.

As illustrated in FIG. 5, when a rotational torque is input to the input member 2 from the input-side mechanism, the input-side engaging portion 6 rotates in the direction of rotation of the input member 2 (clockwise direction in the example in FIG. 5). When this occurs, while the link member 37 pivotally moves about the pivot-support shaft 38, the input-side engaging portion 6 pulls the pivot-support shaft 38 through the link member 37 so that the engaging element 5 (body plate 36) moves to the inner side in the radial direction, which is a direction away from the pressed surface 24. As a result, the elastic member 50 is elastically deformed so that the pressing surface 39 of the engaging element 5 is separated from the pressed surface 24 and the elastic pressing portion 59 as a whole is deformed toward the outer side in the radial direction. In other words, the elastic member 50 is elastically deformed so as to displace the support plate portion 51 to the inner side in the radial direction. Further, the pair of output-side engaged portions 40 of the pair of engaging elements 5 holds the output-side engaging portion 13 of the output member 3 from both sides in the radial direction, and the output-side engaging portion 13 and the pair of output-side engaged portions 40 engage with no looseness. As a result, the rotational torque input to the input member 2 is transmitted to the output member 3 through the pair of engaging elements 5 and output from the output member 3.

Particularly, in the construction of this example, when the engaging element 5 moves to the inner side in the radial direction as described above, as illustrated in FIGS. 4 to 5 and FIGS. 16(A) to 16(B) over time, the guide surfaces 15 located on both sides in the major axis direction of the front-half portion in the minor axis direction of the output-side engaging portion 13 regulate the movement of the engaging element 5 in the width direction by guiding the guided surfaces 43 located on both sides in the width direction of the output-side engaged portion 40. Then, as illustrated in FIGS. 5 and 16(B), the bottom surface 42 of the output-side engaged portion 40 comes into surface contact with the side surface 14 of the output-side engaging portion 13, and the guided surfaces 43 of the output-side engaged portion 40 come into surface contact with the guide surfaces 15 of the output-side engaging portion 13. Therefore, in the construction of this example, it is possible to effectively prevent the engaging element 5 from shifting in the width direction and coming into contact with the pressed surface 24 after releasing the locked or semi-locked state. In the construction of this example, since the output-side engaging portion 13 can be used to guide the engaging element 5 to the inner side in the radial direction, the number of parts can be reduced compared to a construction in which a separate part used only for the guidance is incorporated.

In the construction of this example, the guided surfaces 43 of the output-side engaged portion 40 are configured by concave curved surfaces inclined in directions in which the distance between the two guided surfaces 43 increase as going toward the inner side in the radial direction, and the guide surfaces 15 of the output-side engaging portion 13 are configured by convex curved surfaces that match the concave curved surfaces. Therefore, as illustrated in FIG. 16(A), when the engaging element 5 is separated from the output-side engaging portion 13 to the outer side in the radial direction, a gap is formed between the guided surfaces 43 and the guide surfaces 15, and the size (dimension in the width direction) of the gap becomes larger toward the outer side in the radial direction. Therefore, in the construction of this example, in a state in which the engaging element 5 is separated from the output-side engaging portion 13 to the outer side in the radial direction, the movement of the engaging element 5 in the width direction and in the direction of rotation can be suitably allowed, and it is possible to effectively prevent application of excessive force to the engaging element 5.

On the other hand, when rotational torque is reversely input to the output member 3 from the output-side mechanism, as illustrated in FIG. 6, the output-side engaging portion 13 rotates between the pair of output-side engaged portions 40 in the direction of rotation of the output member 3 (clockwise direction in the example of FIG. 6). Then, a corner portions that is a connecting portion between the side surface 14 and the guide surface 15 of the output-side engaging portion 13 elastically deforms the elastic member 50 so as to displace a part of the elastic pressing portion 59 toward the outer side in the radial direction and to directly press the bottom surface 42 of the output-side engaged portion 40. Due to this, the pair of engaging elements 5 moves in directions (outer side in the radial direction) closer to the pressed surface 24 so as to press the pressing surfaces 39 of the pair of engaging elements 5 against the pressed surface 24 to be frictionally engaged. As a result, the rotational torque reversely input to the output member 3 is completely blocked by being transmitted to the non-rotating housing 4 that is fixed to another member, alternatively, only a part of the rotational torque reversely input to the output member 3 is transmitted to the input member 2 and the remaining part is blocked.

In order to completely block the rotational torque reversely input to the output member 3 and prevent it from being transmitted to the input member 2, the engaging element 5 is held between the output-side engaging portion 13 and the pressed surface 24 to lock the output member 3 so that the pressing surface 39 do not slide or rotate relative to the pressed surface 24. On the other hand, in order to transmit only a part of the rotational torque reversely input to the output member 3 to the input member 2 and block the remaining part, the engaging element 5 is held between the output-side engaging portion 13 and the pressed surface 24 to semi-lock the output member 3 so that the pressing surface 39 slides against the pressed surface 24. When rotational torque is reversely input to the output member 3 in a state where the output member 3 is semi-locked, the engaging element 5 rotates about the rotation center of the output member 3 while causing the pressing surface 39 slide against the pressed surface 24 based on the engagement between the output-side engaging portion 13 and the output-side engaged portion 40. When the engaging element 5 rotates, the input-side engaging portion 6 is pulled by the pivot-support shaft 38 through the link member 37, and a part of the rotational torque is transmitted to the input member 2.

In this example, since the engaging element 5 has pressing surfaces 39 at two locations separated in the circumferential direction of the outer-side surface in the radial direction of the body plate 36, the frictional engagement force between the pressed surface 24 and the pressing surfaces 39 can be increased by the wedge effect when rotational torque is reversely input to the output member 3. However, in a case of implementing the present invention, it is also possible to employ a construction having a pressing surface only at one location in the circumferential direction of the outer-side surface in the radial direction of the body plate.

With the reverse-input blocking clutch 1 according to this example, looseness of the output member 3 can be suppressed even in a neutral state.

In other words, in this example, the elastic member 50 is arranged at a position overlapping the output-side engaging portion 13 in the radial direction of the body plate 36 corresponding to the first direction, and is elastically held between the output-side engaging portion 13 and the engaging element 5. Therefore, even in a case where the distance between the pair of bottom surfaces 42 in the assembled state of the reverse-input blocking clutch 1 is somewhat larger than the thickness dimension in the minor axis direction of the output-side engaging portion 13, that is the distance between the pair of side surfaces 14 taking the workability of the assembly work of the reverse-input blocking clutch 1 into consideration, regardless of the gaps existing between the output-side engaging portion 13 and the output-side engaged portions 40, the output-side engaging portion 13 can be prevented from rotating with a light force, and looseness of the output member 3 can be suppressed. As a result, when the reverse-input blocking clutch 1 of this example is used for purposes such as adjusting the position of the stage fixed to the nut and adjusting the steering angle of a tire and with the output member 3 connected to a screw shaft of the ball screw device and with the input member 2 connected to an electric motor, even if rotational torque is reversely input to the output member 3 from the stage or the tire through the nut, it is possible to prevent the position of the state and the steering angle of the tire from deviating vigorously from the position after adjustment. In other words, it is possible to moderate the progress of the displacement and prevent the occurrence of abnormal noise.

Although different from the construction of this example, when the engaging element includes two body plates separately arranged in the axial direction of the pressed surface, it is possible to easily avoid interference between the output-side engaged portion and the elastic member provided on the inner-side surfaces in the radial direction of the body plate by providing the elastic member between the two body plates. In other words, the output-side engaging portion of the output member and the output-side engaged portion of the body plate can be easily engaged directly without through the elastic member. On the other hand, as in the construction of this example, when the engaging element includes only one body plate, to avoid interference between the output-side engaged portion and the elastic member by the same method as described above, it is necessary to prepare a groove for installing the elastic member on the inner-side surface in the radial direction of the body plate. As a result, the shape of the body plate becomes complicated, and the difficulty of processing the body plate increases, which inevitably increases the manufacturing cost.

On the other hand, in the construction of this example, the elastic member 50 includes an elastic pressing portion 59 that elastically presses the output-side engaging portion 13 of the output member 3, and the elastic pressing portion 59 is arranged at portions separated from and on both sides in the axial direction with respect to the output-side engaged portion 40 of the body plate 36. As a result, interference between the output-side engaged portion 40 and the elastic member 50 provided on the inner-side surface in the radial direction of the body plate 36 can be easily avoided without preparing any groove for installing the elastic member 50 on the inner-side surface in the radial direction of the body plate 36. Therefore, since any groove for installing the elastic member 50 is not required to be prepared on the inner-side surface in the radial direction of the body plate 36, the shape of the body plate 36 can be simplified so that the degree of difficulty in processing the body plate 36 can be reduced and the manufacturing cost can be reduced. As long as the elastic member of the present invention does not hinder the engagement between the output-side engaging portion 13 and the output-side engaged portion 40 and includes the elastic pressing portion 59 that elastically presses the output-side engaging portion 13 against the inner side in the radial direction, the engaging element can be applied not only to the construction in which the engaging element includes only one body plate, but also to the construction in which the engaging element includes two or more body plates.

In this example, the elastic member 50 is not fixed to either the output member 3 (output-side engaging portion 13) or the engaging element 5, but is elastically held between the output-side engaging portion 13 and the engaging element 5. Due to this, the work for fixing the elastic member 50 can be omitted, and the parts used for fixing can be reduced. As a result, the manufacturing cost of the reverse-input blocking clutch 1 can be reduced. Further, since the installation space of the elastic members 50 can be reduced, the size of the reverse-input blocking clutch 1 can be reduced.

By engaging the elastic member 50 with the engaging element 5 (body plate 36), displacement of the elastic members 50 in the axial direction, the width direction, and the radial direction can be regulated. Therefore, even if the elastic member 50 is not fixed to either the output member 3 or the engaging element 5, it is possible to prevent the installation position of the elastic member 50 from deviating and to prevent the elastic member 50 from coming off from between the output-side engaging portion 13 and the engaging element 5. Accordingly, the elastic member 50 can apply elasticity of a desired magnitude and direction to the engaging element 5 and the output-side engaging portion 13.

The elastic member 50 has a function to press the pressing surface 39 of the engaging element 5 against the pressed surface 24 in a neutral state. Therefore, in the neutral state, there is no need to provide a dedicated component (biasing member such as a spring) for pressing the pressing surface 39 of the engaging element 5 against the pressed surface 24. Accordingly, the number of parts can be reduced, and the size of the reverse-input blocking clutch 1 can be reduced.

With the reverse-input blocking clutch 1 of this example, when rotational torque is input to the input member 2, it is possible to smoothly switch from the locked or semi-locked state to the unlocked state. This point will be described with reference to FIGS. 15(A) and 15(B).

FIG. 15(A)(a) and FIG. 15(A)(b) illustrate the mutual positional relationship between a part of the input member 2 and a part of an engaging element 5 in relation to the construction of this example. More specifically, FIG. 15(A)(a) illustrates the positional relationship in the locked or semi-locked state illustrated in FIG. 6 in which the input-side engaging portion 6 is positioned in the central portion in the width direction of the engaging element 5 and the link member 37 is most radially inward. FIG. 15(A)(b) illustrates the positional relationship in a state where translational load F begins to act from the input-side engaging portion 6 to the pivot-support shaft 38 through the link member 37 as the input-side engaging portion 6 rotates in the direction of rotation of the input member 2 (clockwise direction in the illustrated example) from the state illustrated in FIG. 15(A)(a) due to rotational torque T input to the input member 2.

On the other hand, FIG. 15(B)(a) and FIG. 15(B)(b) do not include a link member, and illustrate the mutual positional relationship between a part of the input member 102z and a part of the engaging element 105 in relation to the construction of a reference example in which an integrally configured engaging element 105 has an input-side engaged portion 113 and an output-side engaged portion (not illustrated). More specifically, FIG. 15(B)(a) illustrates the positional relationship in the locked or semi-locked state in which the input-side engaging portion 107z is positioned in the central portion in the width direction of the engaging element 105. FIG. 15(B)(b) illustrates the positional relationship in a state where translational load Ft based on the rotational torque T begins to act on the contact portion X between the input-side engaging portion 107z and the input-side engaged portion 113 as the input-side engaging portion 107z rotates in the direction of rotation of the input member 102z (clockwise direction in the illustrated example) from the state illustrated in FIG. 15(B)(a) and comes into contact with the input side engaged portion 113 of the engaging element 105 due to the rotational torque T input to the input member 102z.

In the construction of the reference example, as illustrated in FIG. 15(B)(b), the direction of the translational load Ft, in other words, the direction of the load acting on the engaging element 105 from the input member 102z is greatly inclined with respect to the radial direction of the engaging element 105 (moving direction of the engaging element 105 going away from or toward the pressed surface), which is a direction in which the engaging element 105 moves when switching from the locked or semi-locked state to the unlocked state.

On the other hand, in the construction of this example, as illustrated in FIG. 15(A)(b), the direction of the translational load F, in other words, the direction of the load acting on the engaging element 5 from the input member 2 is mostly parallel with the radial direction of the engaging element 5 (moving direction of the engaging element 5 going away from or toward the pressed surface 24), which is a direction in which the engaging element 5 moves when switching from the locked or semi-locked state to the unlocked state. In other words, the angle between the direction of the translational load F and the direction in which the engaging element 5 should move is smaller than the angle between the direction of the translational load Ft and the direction in which the engaging element 105 should move in the construction of the reference example. That is, in the construction of this example, the rotational torque T input to the input member 2 can be efficiently converted into a load for moving the engaging element 5 to the inner side in the radial direction. Therefore, with the construction of this example, when rotational torque is input to the input member 2, it is possible to smoothly switch from the locked or semi-locked state to the unlocked state.

In the construction of this example, from the viewpoint of simplifying assembly of the reverse-input blocking clutch, the size of the gap G (the difference Wb−Wa as described above) existing between the inner-side surface in the radial direction of the input-side engaging portion 6 and the inner peripheral surface of the input-side engaged portion 47 of the link member 37 in the state illustrated in FIG. 15(A)(a) and the size of the gap Gz existing between the inner-side surface in the radial direction of the input-side engaging portion 107z and the input-side engaged portion 113 in the state illustrated in FIG. 15(B)(a) are preferably as large as possible; on the other hand, however, from the viewpoint of being able to achieve an unlocked state by immediately moving the engaging element 5, 105 to the inner side in the radial direction when rotational torque is input to the input member 2, 102z, are preferably as small as possible. Accordingly, taking the circumstances above into consideration, it is necessary in the production of the reverse-input blocking clutch to adjust the size of the gap G, Gz to an appropriate size.

In the construction of the reference example, in order to adjust the size of the gap Gz, in some cases it may be necessary to finish the portion of the input-side engaged portion 113 that is in contact with the inner-side surface in the radial direction of the input-side engaging portion 107z with high precision by a cutting process, and in such a case, it is expected that the cost would increase. On the other hand, in the construction of this example, it is possible to adjust the size of the gap G by simply managing the distance between centers of the input-side engaged portion 47 and the pivot-supported portion 48 of the link member 37, and since the link member 37 can be manufactured by inexpensive press working, it is easy to keep costs down.

Further, when the engaging element is configured by pivotally supporting the link member having an input-side engaged portion with respect to the body plate having a pressing surface, a construction is conceivable in which a pair of body plates is separately arranged in the axial direction and one link member is pivotably arranged between the pair of body plates. However, in such a construction, the pair of body plates is required to be connected in a state of being separated in the axial direction, so that the number of parts increases. Further, in the locked or semi-locked state, the pair of body plates is required to have high shape accuracy in order to bring the pressing surfaces of the pair of body plates into contact or sliding contact with the pressed surface.

On the other hand, in this example, a construction is adopted in which a pair of link members 37 each having an input-side engaged portion 47 on both sides in the axial direction of the body plate 36 having a pressing surface 39 so as to be pivotably supported with respect to the body plate 36. Therefore, the number of parts can be suppressed and the shape accuracy of the body plate 36 is not required to be excessively increased, an increase in manufacturing cost can be suppressed. Further, when rotational torque is input from the input member 2 and the pair of engaging elements 5 move to the inner side in the radial direction, the body plate 36 can be prevented from inclining in the axial direction.

Since the reinforcing member 56 is provided so as to span between the tip-end portions of the input-side engaging portions 6 of the pair of input-side engaging portions 6, the pair of input-side engaging portions 6 can be prevented from deforming in directions away from each other. The reason for this will be described below.

When rotational torque is reversely input to the output member 3, the pressing surfaces 39 of the pair of engaging elements 5 are pressed against the pressed surface 24, and the pressing surfaces 39 frictionally engage with the pressed surface 24 so that the reverse-input blocking clutch 1 is switched to the locked or semi-locked state. As the rotational torque reversely input to the output member 3 increases, the force pressing the pressing surfaces 39 against the pressed surface 24 also increases, and the frictional engagement force acting between the pressing surfaces 39 and the pressed surface 24 also increases.

When rotational torque is input to the input member 2, the input-side engaging portions 6 of the pair of input-side engaging portions 6 move the body plates 36 through the link members 37 and the pivot-support shafts 38 in directions in which the pressing surfaces 39 move away from the pressed surface 24, and the pressing surfaces 39 separate from the pressed surface 24. As a result, the reverse-input blocking clutch 1 is switched to the unlocked state.

If the rotational torque that is reversely input to the output member 3 is large and the frictional engagement force that acts between the pressing surfaces 39 and the pressed surface 24 is large when the reverse-input blocking clutch 1 switches to the locked or semi-locked state, the torque (release torque) required to switch the reverse-input blocking clutch 1 from the locked or semi-locked state to the unlocked state increases. In a construction that does not include the reinforcing member 56 as in this example, the release torque becomes large, and if the force applied to the input-side engaging portions 6 from the link members 37 and directed outward with respect to the radial direction of the body plates 36 increases when switching the reverse-input blocking clutch 1 from the locked or semi-locked state to the unlocked state, the input-side engaging portions 6 of the input member 2 may possibly be deformed so as to be curved away from each other. When such deformation occurs, uneven contact may occur between the input-side engaging portions 6 and the input-side engaged portions 47, and when switching the reverse-input blocking clutch 1 from the locked or semi-locked state to the unlocked state, the body plates 36 may incline in the axial direction, making it difficult to smoothly switch to the unlocked state.

In the reverse-input blocking clutch 1 of this example, since the reinforcing member 56 is provided so as to span between the tip-end portions of the input-side engaging portions 6 of the pair of input-side engaging portions 6, it is possible to prevent the input-side engaging portions 6 from deforming in directions away from each other. As a result, it is possible to prevent uneven contact between the input-side engaging portions 6 and the input-side engaged portions 47 so as to suppress the occurrence of wear and to prevent the body plates 36 from inclining in the axial direction, making it possible to smoothly switch to the unlocked state.

Second Example

Figure 17:
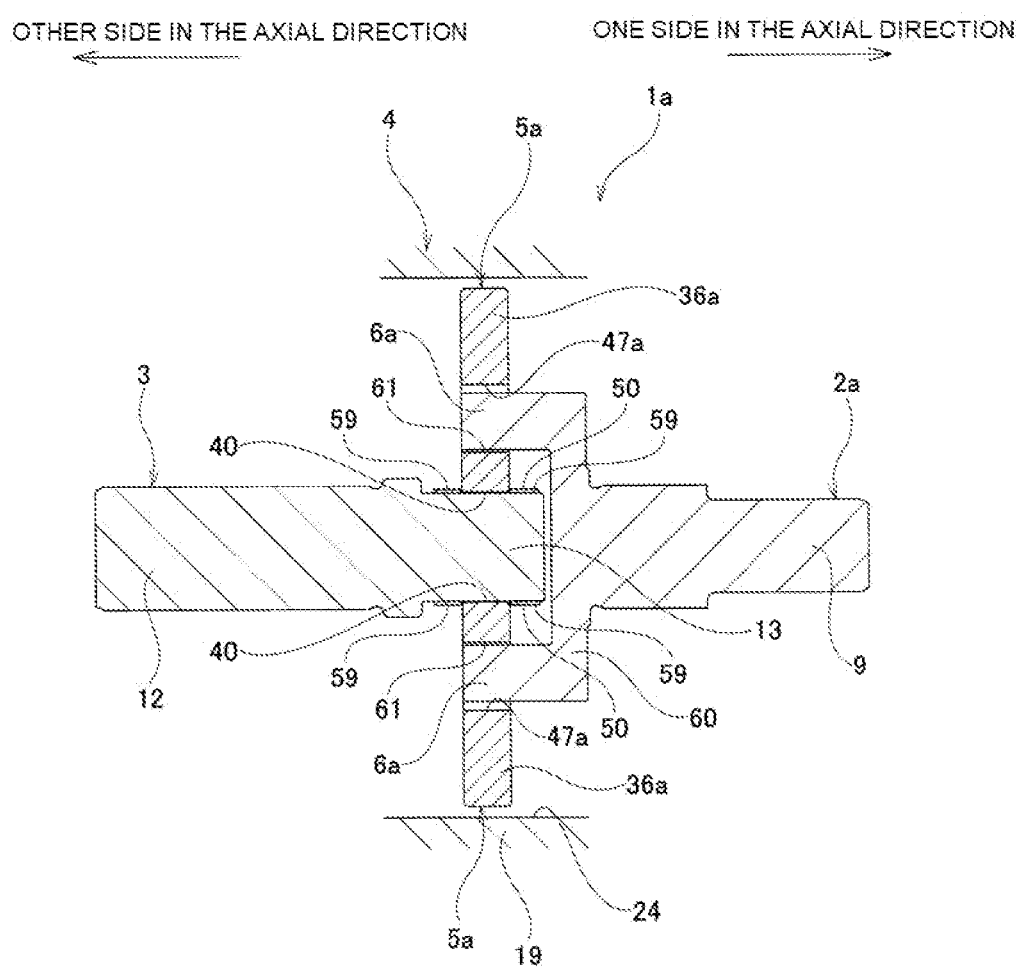
FIG. 17 is a cross sectional view illustrating a part of the reverse-input blocking clutch of a second example of an embodiment of the present invention.
Figure 18:
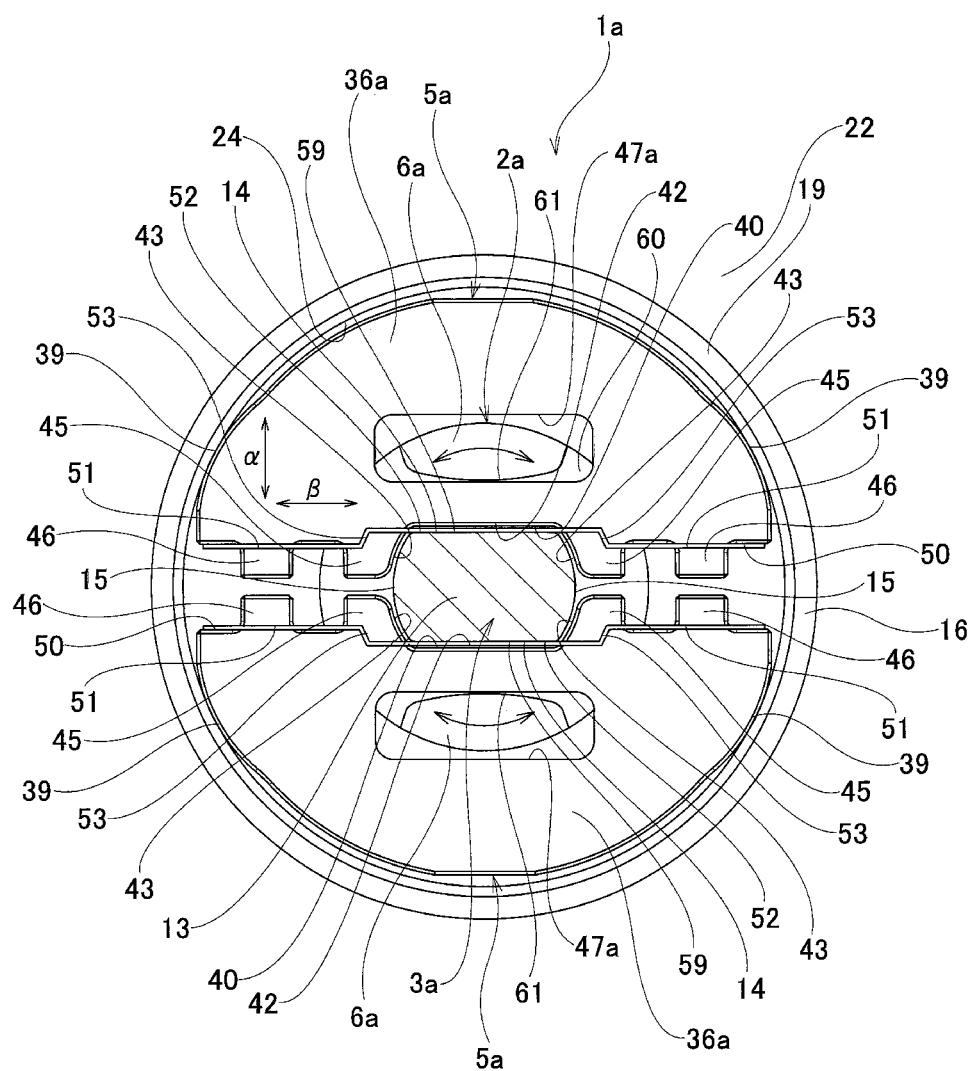
FIG. 18 is a view corresponding to FIG. 4, illustrating a part of the reverse-input blocking clutch of the second example.

A second example of an embodiment of the present invention will be described using FIGS. 17 to 19.

In the reverse-input blocking clutch 1a of this example, the construction of the input member 2a and the pair of engaging elements 5a are partially different from that of the first example. In the following description, only parts of the construction of the second example that differ from the first example will be described.

In this example, the input member 2a has an input shaft portion 9, a base plate portion 60, and a pair of input-side engaging portions 6a.

The base plate portion 60 has a substantially circular end surface shape when viewed from the axial direction.

The input shaft portion 9 protrudes from the central portion of the side surface on the one side in the axial direction of the base plate portion 60 toward the one side in the axial direction. The pair of input-side engaging portions 6a protrude from two locations on the opposite sides in the radial direction of the side surface on the other side in the axial direction of the base plate portion 60 toward the other side in the axial direction. In this example, each input-side engaging portion 6a of the pair of input-side engaging portions 6a has a substantially oval end surface shape extending in the circumferential direction when viewed from the axial direction. In a case of implementing the present invention, each input-side engaging portion of the pair of input-side engaging portions may be configured by a component that is made separately from the base plate portion.

Each engaging element 5a of the pair of engaging elements 5a is configured by only one body plate 36a having a pressing surface 39 and an output-side engaged portion 40. Regarding the body plate 36a, the shape of the outer-side surface in the radial direction including the pair of pressing surfaces 39 and the shape of the inner-side surface in the radial direction including the output-side engaged portion 40 are the same as in the first example.

The body plate 36a has an input-side engaged portion 47a. In this example, the input-side engaged portion 47a has a substantially rectangular opening shape extending in the width direction of the body plate 36a when viewed from the axial direction, and is configured by a through hole passing through in the axial direction of the central portion in the radial direction of the central position in the width direction of the body plate 36a. The input-side engaged portion 47a has a size that allows the input-side engaging portion 6a to be loosely inserted. Therefore, in a state where the input-side engaging portion 6a is inserted inside the input-side engaged portion 47a, a gap exists both in the width direction and in the radial direction of the body plate 36a between the input-side engaging portion 6a and the inner surface of the input-side engaged portion 47a. Accordingly, the input-side engaging portion 6a can be displaced in the direction of rotation of the input member 2a with respect to the input-side engaged portion 47a, and the body plate 36a provided with the input-side engaged portion 47a can be displaced in the radial direction of the body plate 36a with respect to the input-side engaging portion 6a. In this example, the input-side engaged portion 47a includes a flat surface 61 facing outward in the radial direction at an end portion on the inner side with regard to the radial direction of the inner peripheral surface of the body plate 36a.

In the assembled state of the reverse-input blocking clutch 1a, the pair of input-side engaging portions 6a of the input member 2a is inserted in the axial direction into the input-side engaged portions 47a of the pair of engaging elements 5a. In a case of implementing the present invention, as in the case of the first example, a reinforcing member which spans between the tip-end portions of the input-side engaging portions 6a of the pair of input-side engaging portions 6a.

Figure 19:
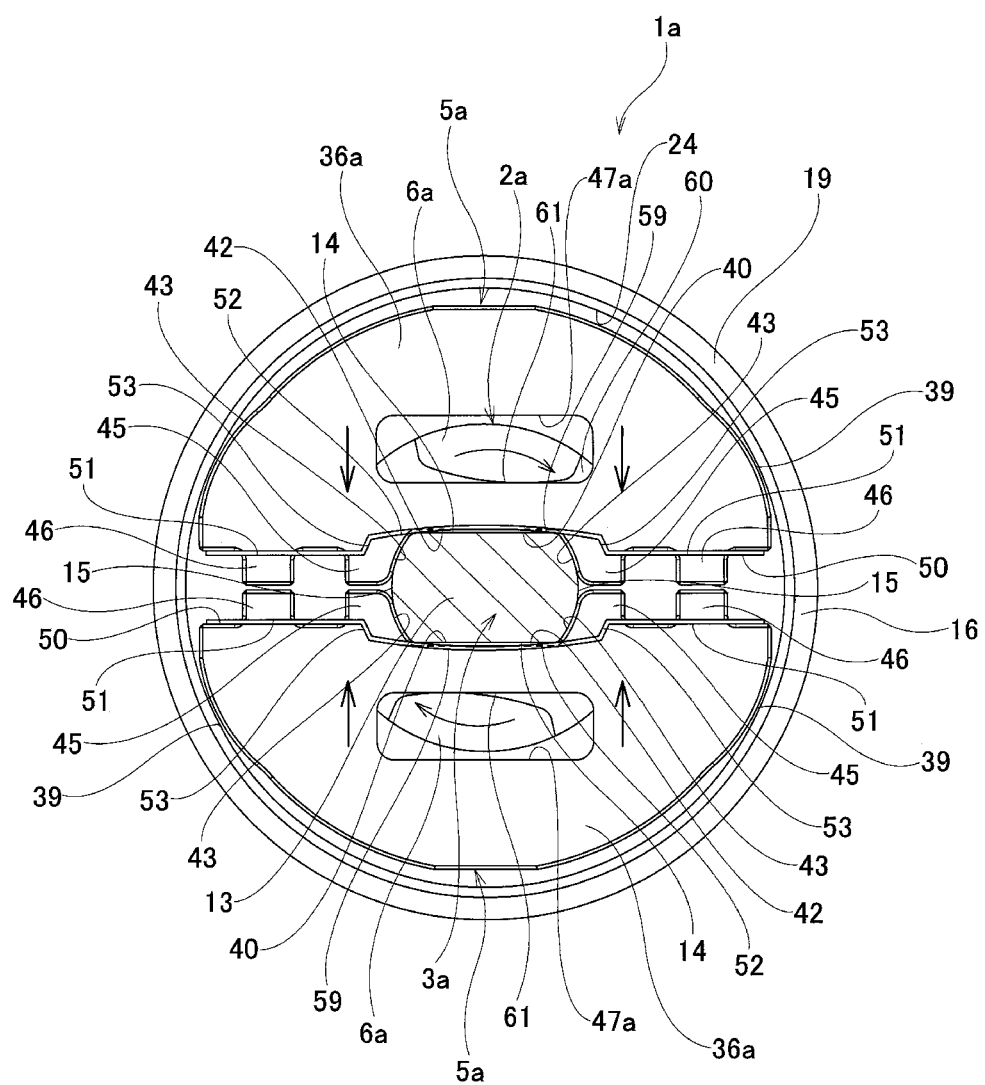
FIG. 19 is a view corresponding to FIG. 5, illustrating a part of the reverse-input blocking clutch of the second example.
Figure 20:
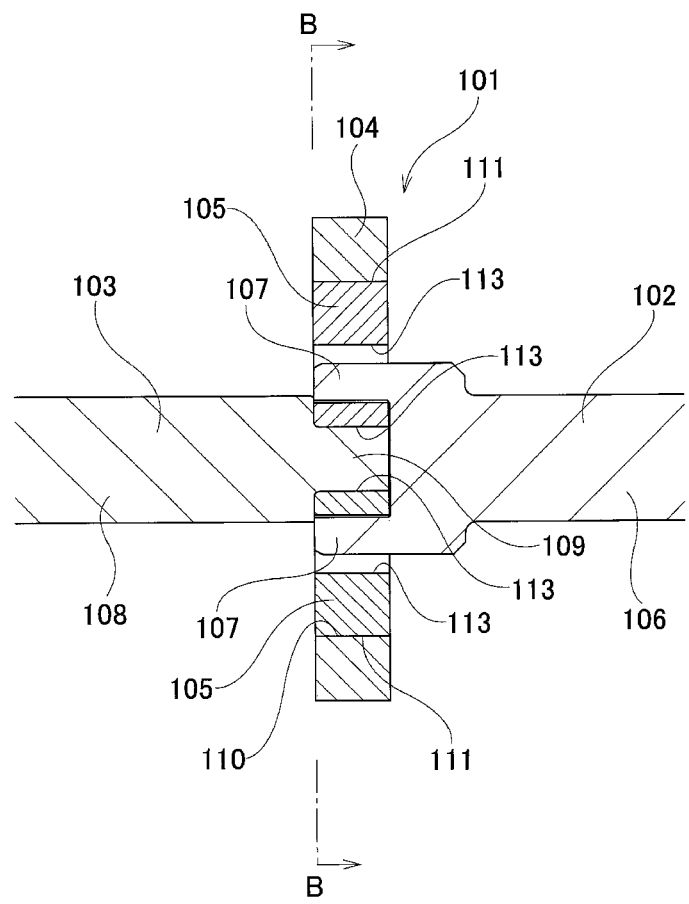
FIG. 20 is a cross sectional view illustrating a conventional reverse-input blocking clutch.
Figure 21:
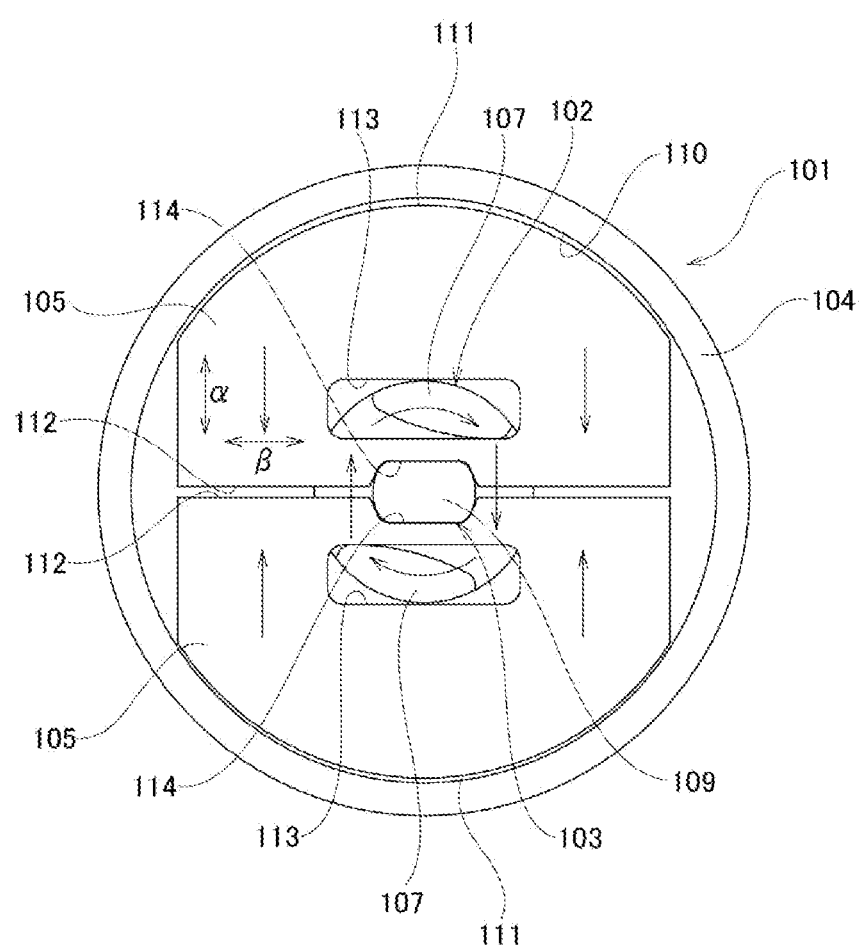
FIG. 21 is a cross sectional view of section B-B in FIG. 20, illustrating a conventional reverse-input blocking clutch in a state where rotational torque is input to the input member.
Figure 22:
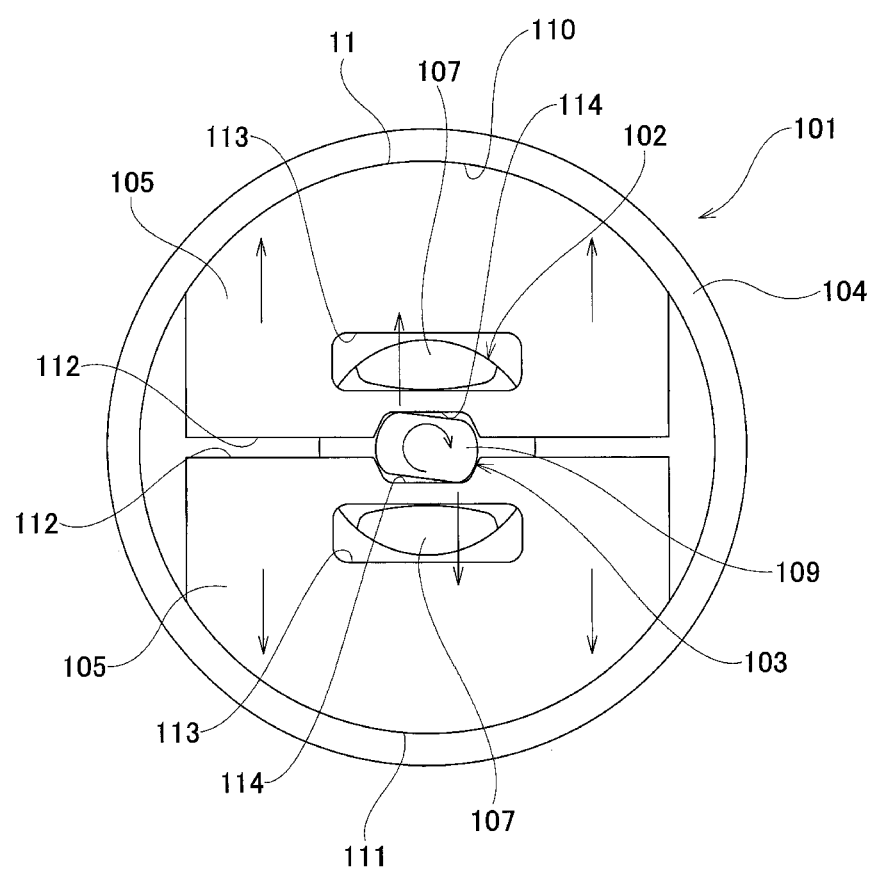
FIG. 22 is a cross sectional view of section B-B in FIG. 20, illustrating a conventional reverse-input blocking clutch in a state where rotational torque is reversely input to the output member.

When rotational torque is input to the input member 2a from the input-side mechanism, as illustrated in FIG. 19, the input-side engaging portion 6a rotates in the direction of rotation of the input member 2a on the inner side of the input-side engaged portion 47a. Then, the inner-side surface in the radial direction of the input-side engaging portion 6a presses the flat surface 61 of the input-side engaged portion 47a inward in the radial direction, and the engaging element 5a moves away from the pressed surface 24. As a result, the pressing surface 39 of the engaging element 5a is separated from the pressed surface 24. Along with this, the elastic member 50 elastically deform so that the elastic pressing portion 59 of the elastic member 50 displaces to the outer side in the radial direction. Then, the pair of output-side engaged portions 40 hold the output-side engaging portion 13 of the output member 3 from both sides in the radial direction so that the output-side engaging portion 13 and the pair of output-side engaged portions 40 engage with no looseness. As a result, the rotational torque input to the input member 2a is transmitted to the output member 3 through the pair of engaging elements 5a, and is output from the output member 3.

On the other hand, when rotational torque is reversely input to the output member 3 from the output-side mechanism, by the same operation as in the case of the first example illustrated in FIG. 6, the elastic member 50 elastically deforms, and the rotational torque that is reversely input to the output member 3 is completely blocked by being transmitted to the housing 4 and is not transmitted to the input member 2a, or only a part of the rotational torque reversely input to the output member 3 is transmitted to the input member 2a and the remaining part is blocked.

In the reverse-input blocking clutch 1a of this example, since each engaging element 5a of the pair of engaging elements 5a is configured only by one body plate 36a and does not have any link member and pivot-support shaft, the number of parts can be reduced. The other configuration and operational effects are the same as in the first example.

The reverse-input blocking clutch of the present invention can also be applied to the reverse-input blocking clutch having a conventional construction described above.

REFERENCE SIGNS LIST 1, 1a Reverse-input blocking clutch
2, 2a Input member
3 Output member
4 Housing
5, 5a Engaging element
6, 6a Input-side engaging portion
7 Shaft member
8 Input-side engaging pin
9 Input shaft portion
10 Input arm portion
11 Support hole
12 Output-shaft portion
13 Output-side engaging portion
14 Side surface
15 Guide surface
16 Input-side housing element
17 Output-side housing element
18 Bolt
19 Outer-diameter-side tubular portion
20 Inner-diameter-side tubular portion
21 Side plate portion
22 Flange portion
23 Through hole
24 Pressed surface
25 Input-side in-row fitting surface
26 Input-side bearing fitting surface
27 Flange portion
28 Inner-diameter-side tubular portion
29 Side plate portion
30 Output-side in-row fitting surface
31 Screw hole
32 Mounting hole
33 Output-side bearing fitting surface
34 Input-side bearing
35 Output-side bearing
36, 36a Body plate
37 Link member
38 Pivot-support shaft
39 Pressing surface
40 Output-side engaged portion
41 Pivot-support portion
42 Bottom surface
43 Guided surface
44 Insertion hole
45 First convex portion
46 Second convex portion
47, 47a Input-side engaged portion
48 Pivot-supported portion
49 Long hole
50 Elastic member
51 Support plate portion
52 Pressing plate portion
53 Connecting plate portion
54 First through hole
55 Second through hole
56 Reinforcing member
57 Insertion hole
58 Support hole
59 Elastic pressing portion
60 Base plate portion
61 Flat surface
101 Reverse-input blocking clutch
102, 102z Input member
103 Output member
104 Pressed member
105 Engaging element
106 Input shaft portion
107, 107z Input-side engaging portion
108 Output-shaft portion
109 Output-side engaging portion
110 Pressed surface
111 Pressing surface
112 Bottom surface
113 Input-side engaged portion
114 Output-side engaged portion

The invention claimed is:
1. A reverse-input blocking clutch, comprising:
a pressed member having a pressed surface around an inner peripheral surface thereof;
an input member having an input-side engaging portion arranged on an inner side in a radial direction of the pressed surface, and coaxially arranged with the pressed surface;
an output member having an output-side engaging portion on the inner side in the radial direction of the pressed surface arranged further on the inner side in the radial direction than the input-side engaging portion, and coaxially arranged with the pressed surface; and
an engaging element having a pressing surface facing the pressed surface, an input-side engaged portion engageable with the input-side engaging portion, and an output-side engaged portion engageable with the output-side engaging portion, and arranged on the inner side in the radial direction of the pressed surface so as to move in a first direction as a direction away from or toward the pressed surface;
when rotational torque is input to the input member, the engaging element displacing away from the pressed surface based on engagement between the input-side engaging portion and the input-side engaged portion, engaging the output-side engaged portion with the output-side engaging portion, and transmitting the rotational torque input to the input member to the output member, and when rotational torque is reversely input to the output member, the engaging element engaging the output-side engaging portion with the output-side engaged portion, pressing the pressing surface against the pressed surface, and frictionally engaging the pressing surface with the pressed surface; and
an elastic member elastically held between the output-side engaging portion and the engaging element so as to press the output-side engaging portion to a side away from the pressed surface in the first direction and press the engaging element to a side closer to the pressed surface in the first direction;

the elastic member including an elastic pressing portion arranged at a position deviated in an axial direction with regard to the output-side engaged portion with regard to the axial direction of the pressed surface at a position overlapping the output-side engaging portion with regard to the first direction, and elastically pressing the elastic pressing portion against the output-side engaging portion, wherein the elastic member is configured by a leaf spring.

2. The reverse-input blocking clutch according to claim 1, wherein
the elastic pressing portion is arranged at positions deviated to both sides in the axial direction with respect to the output-side engaged portion with regard to the axial direction of the pressed surface.

3. The reverse-input blocking clutch according to claim 1, wherein
the elastic member is elastically held between the output-side engaging portion and the engaging element without being fixed to either the output member or the engaging element.

4. The reverse-input blocking clutch according to claim 3, wherein
displacement of the elastic member in a direction orthogonal to the first direction is regulated based on an engagement with the engaging element.

5. The reverse-input blocking clutch according to claim 1, wherein
the leaf spring has a first through hole passing through in the first direction at a location aligned with the output-side engaged portion, and the elastic pressing portion is arranged on both sides of the first through hole with regard to the axial direction of the pressed surface.

6. The reverse-input blocking clutch according to claim 5, wherein
the engaging element has a first convex portion inserted through the first through hole, and displacement of the elastic member with regard to the axial direction of the pressed surface and/or displacement of the elastic member in a second direction orthogonal to both the first direction and the axial direction of the pressed surface are regulated based on engagement between the first through hole and the first convex portion inserted through the first through hole.

7. The reverse-input blocking clutch according to claim 5, wherein
the leaf spring has a second through hole passing through in the first direction at a location deviated from the first through hole in the second direction orthogonal to both the first direction and the axial direction of the pressed surface;
the engaging element has a second convex portion inserted through the second through hole; and
displacement of the elastic member with regard to the axial direction of the pressed surface and/or displacement of the elastic member in the second direction are regulated based on engagement between the second through hole and the second convex portion inserted through the second through hole.

8. The reverse-input blocking clutch according to claim 1, wherein
the engaging element includes only one body plate having the pressing surface and the output-side engaged portion.

9. The reverse-input blocking clutch according to claim 8, wherein
the engaging element has the body plate and a link member arranged adjacent to the body plate in the axial direction; and
the body plate has a pivot-support portion located on a side closer to the pressed surface than the input-side engaging portion with regard to the first direction;
the link member has the input-side engaged portion and a pivot-supported portion pivotably supported by the pivot-support portion; and
when a rotational torque is input to the input member, the engaging element moves away from the pressed surface by the pivot-supporting portion being pulled by the input-side engaging portion through the link member, causing the output-side engaged portion to engage with the output-side engaging portion, and transmits the rotational torque input to the input member to the output member.

10. The reverse-input blocking clutch according to claim 9, wherein
the link member is configured by a pair of link members provided to hold the body plate from both sides in the axial direction.

11. The reverse-input blocking clutch according to claim 9, wherein
the pivot-support portion is configured by a plate-side through hole provided in the body plate, and the pivot-supported portion is configured by a link-side through hole provided in the link member; and
the engaging element has a pivot-support shaft inserted through the plate-side through hole and the link-side through hole.

12. The reverse-input blocking clutch according to claim 1, wherein
the engaging element is configured by a pair of engaging elements arranged so as to hold the output-side engaging portion from both sides in the radial direction, and the input-side engaging portion of the input member is configured by a pair of input-side engaging portions.

13. The reverse-input blocking clutch according to claim 12, further comprising: a reinforcing member that spans between tip-end portions of the input-side engaging portions of the pair of input-side engaging portions.

* * * * *